United States Patent
Ohishi

Patent Number: 5,802,081
Date of Patent: Sep. 1, 1998

[54] DIGITAL INFORMATION MODULATING APPARATUS

[75] Inventor: Takeo Ohishi, Yokohama, Japan

[73] Assignee: Victor Company of Japan, Ltd., Yokohama, Japan

[21] Appl. No.: 495,071

[22] Filed: Jun. 27, 1995

[30] Foreign Application Priority Data

Jun. 29, 1994 [JP] Japan ................... 6-170211

[51] Int. Cl.⁶ .................................. G11B 20/08
[52] U.S. Cl. ........................... 371/55; 360/29
[58] Field of Search ...................... 360/29, 43, 40, 360/41; 371/55

[56] References Cited

U.S. PATENT DOCUMENTS

| | | |
|---|---|---|
| 5,140,474 | 8/1992 | Kahlman et al. ............ 360/40 |
| 5,142,421 | 8/1992 | Kahlman et al. ............ 360/40 |
| 5,432,651 | 7/1995 | Maeno et al. ............... 360/41 |
| 5,579,182 | 11/1996 | Hamai et al. ............... 360/41 |

*Primary Examiner*—Stephen M. Baker
*Attorney, Agent, or Firm*—Pollock, Vande Sande & Priddy

[57] ABSTRACT

Information is divided into first blocks each having m bits, and n bit or bits in each of S different states are added to a head of each of the first blocks to change the first block into S second blocks each having m+n bits, where m and n denote predetermined natural numbers and S denotes a predetermined natural number equal to or smaller than $2^n$. Each of the S second blocks is pre-coded into S pre-coded information blocks respectively. One of the S pre-coded information blocks is selected as a modulation-resultant information signal in response to error signals related to the S pre-coded information blocks respectively. The modulation-resultant information signal has q different notch frequencies. The S pre-coded information blocks are converted into S amplitude signals representing amplitude values respectively. A set of q first waveform signals and a set of q second waveform signals are generated. The q first waveform signals represent waveforms related to the q notch frequencies respectively. The q second waveform signals are different in phase from the q first waveform signals by 90° respectively. Each of the S amplitude signals and the 2q waveform signals are multiplied into 2q multiplication-resultant signals. The 2q multiplication-resultant signals are added and accumulated into 2q addition-resultant signals respectively with respect to each of the S pre-coded information blocks. An error signal is generated in response to the 2q addition-resultant signals, and thereby the S error signals are generated which relate to the S pre-coded information blocks respectively.

14 Claims, 9 Drawing Sheets

| | | | | | | |
|---|---|---|---|---|---|---|
| (A) | 0 | $S_0$ | $S_1$ | $S_2$ | $S_3$ | $S_4$ |
| (B) | 0 | 0 | 0 | $S_0$ | $S_1$ | $S_0 \oplus S_2$ |
| (C) | 0 | $S_0$ | $S_1$ | $S_0 \oplus S_2$ | $S_1 \oplus S_3$ | $S_0 \oplus S_2 \oplus S_4$ |
| | $(d_0)$ | $(d_1)$ | $(d_2)$ | $(d_3)$ | $(d_4)$ | $(d_5)$ |
| (D) | 1 | $S_0$ | $S_1$ | $S_2$ | $S_3$ | $S_4$ |
| (E) | 0 | 0 | 1 | $S_0$ | $S_1'$ | $S_0 \oplus S_2$ |
| (F) | 1 | $S_0$ | $S_1'$ | $S_0 \oplus S_2$ | $S_1' \oplus S_3$ | $S_0 \oplus S_2 \oplus S_4$ |
| | $(D_0)$ | $(D_1)$ | $(D_2)$ | $(D_3)$ | $(D_4)$ | $(D_5)$ |
| (G) | 0 | 0 | $S_0$ | $S_1$ | $S_2$ | $S_3$ | $S_4$ |
| (H) | 0 | 0 | 0 | 0 | $S_0$ | $S_1$ | $S_0 \oplus S_2$ |
| (I) | 0 | 0 | $S_0$ | $S_1$ | $S_0 \oplus S_2$ | $S_1 \oplus S_3$ | $S_0 \oplus S_2 \oplus S_4$ |
| | $(d_0)$ | $(d_1)$ | $(d_2)$ | $(d_3)$ | $(d_4)$ | $(d_5)$ | $(d_6)$ |
| (J) | 1 | 1 | $S_0$ | $S_1$ | $S_2$ | $S_3$ | $S_4$ |
| (K) | 0 | 0 | 1 | 1 | $S_0'$ | $S_1'$ | $S_0' \oplus S_2$ |
| (L) | 1 | 1 | $S_0'$ | $S_1'$ | $S_0' \oplus S_2$ | $S_1' \oplus S_3$ | $S_0' \oplus S_2 \oplus S_4$ |
| | $(D_0)$ | $(D_1)$ | $(D_2)$ | $(D_3)$ | $(D_4)$ | $(D_5)$ | $(D_6)$ |

5,802,081

1

DIGITAL INFORMATION MODULATING APPARATUS

BACKGROUND OF THE INVENTION

1. Field of the Invention

This invention relates to a digital information modulating apparatus usable in various systems such as a system for recording a digital information signal or a digital video signal on a recording medium.

2. Description of the Prior Art

A known method of digital modulation for a digital VTR (video tape recorder) executes 24–25 conversion to enable the generation of pilot signals for tracking. In the 24–25 conversion, a bit sequence representing information to be recorded is separated into groups each having 24 successive bits, and one bit is added to the head of every group. The conversion-resultant bit sequence is recorded on a magnetic tape after being subjected to NRZI encoding for record.

The added bits are set to "1" or "0" in a manner such that the difference between the number of bits of "1" and the number of bits of "0" in each given length of the conversion-resultant bit sequence, that is, the digital sum variation (DSV), will periodically change to generate two pilot signals having different preset frequencies $\omega 1$ and $\omega 2$.

There are provided three different types F0, F1, and F2 of recording tracks on the magnetic tape according to the pilot signals. An F0-type recording track is designed to generate no pilot signals. An F1-type recording track is designed to generate the pilot signal having the preset frequency $\omega 1$. An F2-type recording track is designed to generate the pilot signal having the preset frequency $\omega 2$.

On the magnetic tape, recording tracks of the different types are arranged as F0, F1, F0, F2, F0, . . . Specifically, F1-type recording tracks and F2-type recording tracks are alternately present between F0-type recording tracks.

While a magnetic head scans an F0-type recording track, tracking control is executed so that the magnitudes of pilot signals leaked from neighboring tracks will be substantially equal. To enable easy detection of leaked pilot signals, an F0-type recording track is designed to correspond to a frequency spectrum having notches at the preset frequencies $\omega 1$ and $\omega 2$.

SUMMARY OF THE INVENTION

It is an object of this invention to provide an improved digital information modulating apparatus.

A first aspect of this invention provides a digital information modulating apparatus comprising means for dividing information into first blocks each having m bits, where m denotes a predetermined natural number; means for adding n bit or bits in each of S different states to a head of each of the first blocks to change the first block into S second blocks each having m+n bits, where n denotes a predetermined natural number and S denotes a predetermined natural number equal to or smaller than $2^n$; means for pre-coding each of the S second blocks into S pre-coded information blocks respectively; means for selecting one of the S pre-coded information blocks as a modulation-resultant information signal in response to error signals related to the S pre-coded information blocks respectively, the modulation-resultant information signal having q different notch frequencies; means for converting the S pre-coded information blocks into S amplitude signals representing amplitude values respectively; means for generating 2q different wave-

2 form signals grouped into a set of q first waveform signals and a set of q second waveform signals, the q first waveform signals representing waveforms related to the q notch frequencies respectively, the q second waveform signals being different in phase from the q first waveform signals by 90° respectively; means for multiplying each of the S amplitude signals and the 2q waveform signals into 2q multiplication-resultant signals; means for adding and accumulating the 2q multiplication-resultant signals into 2q addition-resultant signals respectively with respect to each of the S pre-coded information blocks; and means for generating an error signal in response to the 2q addition-resultant signals, and thereby generating the S error signals related to the S pre-coded information blocks respectively.

A second aspect of this invention is based on the first aspect thereof, and provides a digital information modulating apparatus further comprising means for generating a pilot information signal; and means for processing the S amplitude signals in response to the pilot information signal before the S amplitude signals are fed to the multiplying means.

A third aspect of this invention is based on the second aspect thereof, and provides a digital information modulating apparatus wherein the pilot-information-signal generating means comprises a pilot-information-signal generator used in common with respect to the generation of the S error signals.

A fourth aspect of this invention is based on the first aspect thereof, and provides a digital information modulating apparatus further comprising means for generating a pilot information signal representing a predetermined frequency equal to one of the q notch frequencies; and means for processing addition-resultant signals among the 2q addition-resultant signals in response to the pilot information signal before the addition-resultant signals are fed to the error-signal generating means, wherein the processed addition-resultant signals relate to the notch frequency equal to the frequency represented by the pilot information signal.

A fifth aspect of this invention is based on the first aspect thereof, and provides a digital information modulating apparatus further comprising means for generating a pilot information signal representing a predetermined frequency equal to one of the q notch frequencies and representing a predetermined phase equal to a phase of one of the 2q waveform signals; and means for processing addition-resultant signals among the 2q addition-resultant signals in response to the pilot information signal before the addition-resultant signals are fed to the error-signal generating means, wherein the processed addition-resultant signals relate to the notch frequency equal to the frequency of the pilot information signal, and relate to the waveform signal equal in phase with the pilot information signal.

A sixth aspect of this invention is based on the fourth aspect thereof, and provides a digital information modulating apparatus wherein the pilot-information-signal generating means comprises a pilot-information-signal generator used in common with respect to the generation of the S error signals.

A seventh aspect of this invention is based on the first aspect thereof, and provides a digital information modulating apparatus wherein the error-signal generating means comprises means for accumulating the 2q addition-resultant signals into 2q accumulation-resultant signals with respect to each of the S pre-coded information blocks respectively; means for squaring the 2q accumulation-resultant signals and thereby converting the 2q accumulation-resultant signals into 2q squaring-resultant signals respectively; means for weighting the 2q squaring-resultant signals in response to predetermined weight coefficients, and thereby converting the 2q squaring-resultant signals into 2q weighting-resultant signals respectively; and means for generating an error signal in response to the 2q weighting-resultant signals, and thereby generating the S error signals related to the S pre-coded information blocks respectively.

An eighth aspect of this invention is based on the seventh aspect thereof, and provides a digital information modulating apparatus wherein the accumulating means comprises means for limiting the 2q accumulation-resultant signals in response to predetermined upper and lower limit values.

A ninth aspect of this invention is based on the first aspect thereof, and provides a digital information modulating apparatus wherein the waveform-signal generating means comprises waveform-signal generators used in common with respect to the generation of the S error signals.

A tenth aspect of this invention provides a digital information modulating apparatus comprising means for dividing an information-representing bit sequence into first blocks each having m bits, where m denotes a predetermined natural number equal to 1 or more; means for adding one of a bit of "0" and a bit of "1" to a head of each of the first blocks to change the first block into a second block having m+1 bits; means for delaying each of the second blocks by two bits and generating a first delay-resultant signal, and adding a current bit of the second block and a current bit of the first delay-resultant signal to pre-code each of the second blocks into a first pre-coded information block; means for generating a second pre-coded information block in response to the first pre-coded information block, the second pre-coded information block corresponding to a resultant of adding the other of a bit of "0" and a bit of "1" to a head of each of the first blocks; means for selecting one of the first and second pre-coded information blocks as a modulation-resultant information signal in response to error signals related to the first and second pre-coded information blocks respectively, the modulation-resultant information signal having q different notch frequencies; means for converting the first pre-coded information block into an amplitude signal representing an amplitude value for every bit with respect to the first pre-coded information block; means for generating 2q different waveform signals grouped into a set of q first waveform signals and a set of q second waveform signals, the q first waveform signals representing waveforms related to the q notch frequencies respectively, the q second waveform signals being different in phase from the q first waveform signals by 90° respectively; means for multiplying the amplitude signal and the 2q waveform signals into 2q multiplication-resultant signals; means for adding and accumulating even-numbered bits of the 2q multiplication-resultant signals into 2q even-numbered addition-resultant signals respectively; means for adding and accumulating odd-numbered bits of the 2q multiplication-resultant signals into 2q odd-numbered addition-resultant signals respectively; means for adding the 2q even-numbered addition-resultant signals and the 2q odd-numbered addition-resultant signals into 2q first calculation-resultant signals respectively; means for subtracting the 2q even-numbered addition-resultant signals from the 2q odd-numbered addition-resultant signals, and thereby generating 2q second calculation-resultant signals respectively; means for generating the first error signal in response to the 2q first calculation-resultant signal; and means for generating the second error signal in response to the 2q second calculation-resultant signal.

An eleventh aspect of this invention provides a digital information modulating apparatus comprising means for dividing an information-representing bit sequence into first blocks each having m bits or m−1 bits, wherein each of the first blocks having m−1 bits represent fixed information, and m denotes a predetermined natural number equal to 1 or more; means for adding one of a bit of "0" and a bit of "1" to a head of each of the first blocks having m bits, and adding one of bits of "00" and bits of "11" to a head of each of the first blocks having m−1 bits to change every first block into a second block having m+1 bits; means for delaying each of the second blocks by two bits and generating a first delay-resultant signal, and adding a current bit of the second block and a current bit of the first delay-resultant signal to pre-code each of the second blocks into a first pre-coded information block; means for generating a second pre-coded information block in response to the first pre-coded information block, the second pre-coded information block corresponding to a resultant of adding the other of a bit of "0" and a bit of "1" to a head of each of the first blocks having m bits and addition of the other of bits of "00" and bits of "11" to a head of each of the first blocks having m−1 bits; means for selecting one of the first and second pre-coded information blocks as a modulation-resultant information signal in response to a first error signals related to the first pre-coded information block, a second error signal related to the second pre-coded information block, and a third error signal related to the fixed information, the modulation-resultant information signal having q different notch frequencies; means for converting the first pre-coded information block into an amplitude signal representing an amplitude value for every bit with respect to the first pre-coded information block; means for generating 2q different waveform signals grouped into a set of q first waveform signals and a set of q second waveform signals, the q first waveform signals representing waveforms related to the q notch frequencies respectively, the q second waveform signals being different in phase from the q first waveform signals by 90° respectively; means for multiplying the amplitude signal and the 2q waveform signals into 2q multiplication-resultant signals; means for adding and accumulating even-numbered bits of the 2q multiplication-resultant signals into 2q even-numbered addition-resultant signals respectively; means for adding and accumulating odd-numbered bits of the 2q multiplication-resultant signals into 2q odd-numbered addition-resultant signals respectively; means for adding the 2q even-numbered addition-resultant signals and the 2q odd-numbered addition-resultant signals into 2q first calculation-resultant signals respectively; means for subtracting the 2q even-numbered addition-resultant signals from the 2q odd-numbered addition-resultant signals, and thereby generating 2q second calculation-resultant signals respectively; means for generating 2q third calculation-resultant signals equal to sign-inversions of the first calculation-resultant signals respectively; means for generating the first error signal in response to the 2q first calculation-resultant signal; means for generating the second error signal in response to the 2q second calculation-resultant signal, and means for generating the third error signal in response to the 2q third calculation-resultant signal.

A twelfth aspect of this invention is based on the tenth aspect thereof, and provides a digital information modulating apparatus further comprising means for generating a pilot information signal representing a predetermined frequency equal to one of the q notch frequencies; and means for processing addition-resultant signals among the 2q first calculation-resultant signals and the 2q second calculation-resultant signals in response to the pilot information signal before the addition-resultant signals are fed to the error-signal generating means, wherein the processed addition-resultant signals relate to the notch frequency equal to the frequency represented by the pilot information signal.

A thirteenth aspect of this invention is based on the tenth aspect thereof, and provides a digital information modulating apparatus further comprising means for generating a pilot information signal representing a predetermined frequency equal to one of the q notch frequencies and representing a predetermined phase equal to a phase of one of the 2q waveform signals; and means for processing addition-resultant signals among the 2q first calculation-resultant signals and the 2q second calculation-resultant signals in response to the pilot information signal before the addition-resultant signals are fed to the error-signal generating means, wherein the processed addition-resultant signals relate to the notch frequency equal to the frequency of the pilot information signal, and relate to the waveform signal equal in phase with the pilot information signal.

BRIEF DESCRIPTION OF THE DRAWINGS

FIG. 14 is a diagram of examples of blocks in bit sequences.

DESCRIPTION OF THE PREFERRED EMBODIMENTS

Before a detailed description of this invention, a background-art modulating apparatus will be described for a better understanding of this invention.

Figure 1:
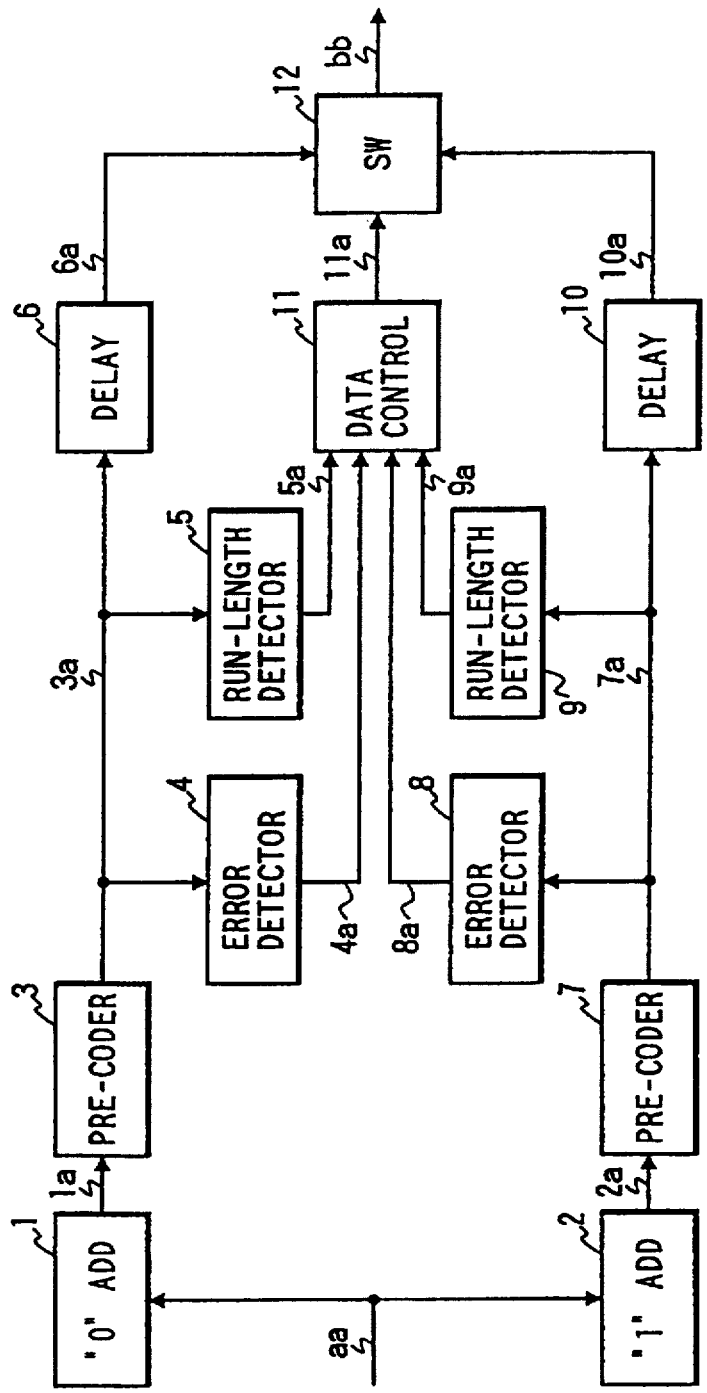
FIG. 1 is a block diagram of a background-art modulating apparatus.

FIG. 1 shows a background-art modulating apparatus. As shown in FIG. 1, the background-art modulating apparatus includes a "0" adding device 1 and a "1" adding device 2 to which an input information signal "aa" is fed. The input information signal "aa" has a sequence of bits.

Figure 2:
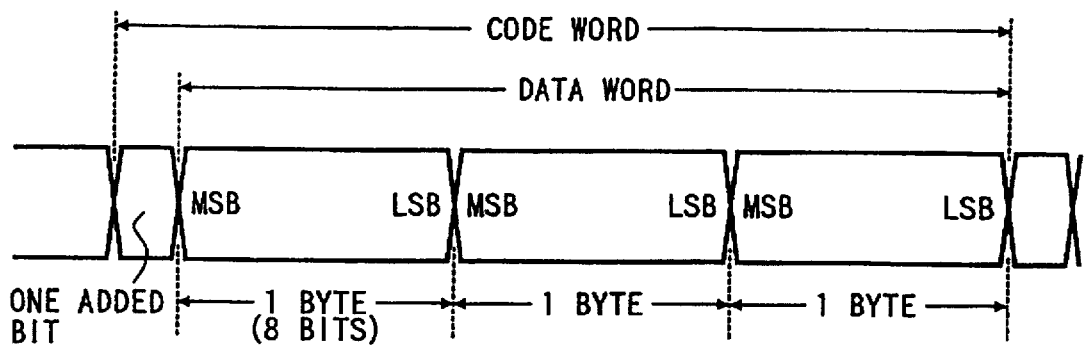
FIG. 2 is a diagram of the format of an information signal which results from 24–25 conversion.

The "0" adding device 1 and the "1" adding device 2 handle the input information signal "aa" 8 bits by 8 bits, that is, one byte by one byte. The "0" adding device 1 and the "1" adding device 2 execute the following 24–25 conversions of the input information signal "aa". As shown in FIG. 2, every three successive bytes of the input information signal "aa" compose one data word (a 24-bit block). The "0" adding device 1 adds a bit of "0" to the head of every data word, and thereby encodes the data word into a code word (a 25-bit block). In this way, the "0" adding device 1 encodes the input information signal "aa" into a coded information signal 1a. On the other hand, the "1" adding device 2 adds a bit of "1" to the head of every data word, and thereby encodes the data word into a code word (a 25-bit block). In this way, the "1" adding device 2 encodes the input information signal "aa" into a coded information signal 2a.

In the background-art modulating apparatus of FIG. 1, a pre-coder 3 receives the information signal 1a from the "0" adding device 1. This device 3 converts the information signal 1a into a pre-coded information signal 3a. A delay device 6 receives the pre-coded information signal 3a from the pre-coder 3. The delay device 6 delays the pre-coded information signal 3a, and thereby converts the pre-coded information signal 3a into a delay-resultant pre-coded information signal 6a for timing adjustment. The delay device 6 outputs the delay-resultant pre-coded information signal 6a to a switch 12.

In the background-art modulating apparatus of FIG. 1, a precoder receives the information signal 2a from the "1" adding device 2. This device 7 converts the information signal 2a into a pre-coded information signal 7a. A delay device 10 receives the pre-coded information signal 7a from the pre-coder 7. The delay device 10 delays the pre-coded information signal 7a, and thereby converts the pre-coded information signal 7a into a delay-resultant pre-coded information signal 10a for timing adjustment. The delay device 10 outputs the delay-resultant pre-coded information signal 10a to the switch 12.

In the background-art modulating apparatus of FIG. 1, an error detector 4 receives the pre-coded information signal 3a from the pre-coder 3. The error detector 4 detects the frequency condition (the frequency spectrum) of the pre-coded information signal 3a, and compares the detected frequency condition of the pre-coded information signal 3a with a desired frequency condition (a desired frequency spectrum). The error detector 4 generates an error signal 4a representing the difference (the error) between the detected frequency condition and the desired frequency condition. The error detector 4 outputs the error signal 4a to a data controller 11.

In addition, a run-length detector 5 receives the pre-coded information signal 3a from the pre-coder 3. The run-length detector 5 generates a run-length detection signal 5a from the pre-coded information signal 3a. The run-length detection signal 5a represents the number of successive bits of a same logic state (that is, a run length) in the pre-coded information signal 3a. The run-length detector 5 outputs the run-length detection signal 5a to the data controller 11.

In the background-art modulating apparatus of FIG. 1, an error detector 8 receives the pre-coded information signal 7a from the pre-coder 7. The error detector 8 detects the frequency condition (the frequency spectrum) of the pre-coded information signal 7a, and compares the detected frequency condition of the pre-coded information signal 7a with a desired frequency condition (a desired frequency spectrum). The error detector 8 generates an error signal 8a representing the difference (the error) between the detected frequency condition and the desired frequency condition. The error detector 8 outputs the error signal 8a to the data controller 11.

In addition, a run-length detector 9 receives the pre-coded information signal 7a from the pre-coder 7. The run-length detector 9 generates a run-length detection signal 9a from the pre-coded information signal 7a. The run-length detection signal 9a represents the number of successive bits of a same logic state (that is, a run length) in the pre-coded information signal 7a. The run-length detector 9 outputs the run-length detection signal 9a to the data controller 11.

The data controller 11 generates a control signal 11a in response to the error signals 4a and 8a and the run-length detection signals 5a and 9a. The data controller 11 outputs the generated control signal 11a to the switch 12. The switch 12 selects one of the delay-resultant pre-coded information signals 6a and 10a in response to the control signal 11a, and transmits the selected signal as an output information signal or a modulation-resultant information signal "bb".

The data controller 11 includes, for example, a signal processor or a microcomputer programmed to execute the following functions. In the case where one of the run lengths represented by the run-length detection signals 5a and 9a exceeds a threshold value, the data controller 11 sets the control signal 11a to a state enabling the switch 12 to select one of the delay-resultant pre-coded information signals 6a and 10a which is unrelated to the excess over the threshold value. In the case where both the run lengths represented by the run-length detection signals 5a and 9a exceed the threshold value and where the run lengths are different from each other, the data controller 11 sets the control signal 11a to a state enabling the switch 12 to select one of the delay-resultant pre-coded information signals 6a and 10a which is related to the smaller run-length. In the case where both the run lengths represented by the run-length detection signals 5a and 9a exceed the threshold value and where the run lengths are equal to each other, the data controller 11 compares the errors represented by the error signals 4a and 8a and sets the control signal 11a to a state enabling the switch 12 to select one of the delay-resultant pre-coded information signals 6a and 10a which is related to the smaller error. In the case where both the run lengths represented by the run-length detection signals 5a and 9a do not exceed the threshold value, the data controller 11 compares the errors represented by the error signals 4a and 8a and sets the control signal 11a to a state enabling the switch 12 to select one of the delay-resultant pre-coded information signals 6a and 10a which is related to the smaller error.

In the background-art modulating apparatus of FIG. 1, the error detectors 4 and 8 tend to be complicated in structure. As will be made clear later, this invention is designed to remove such a problem. This invention will be described in detail hereinafter.

First Embodiment

Figure 3:
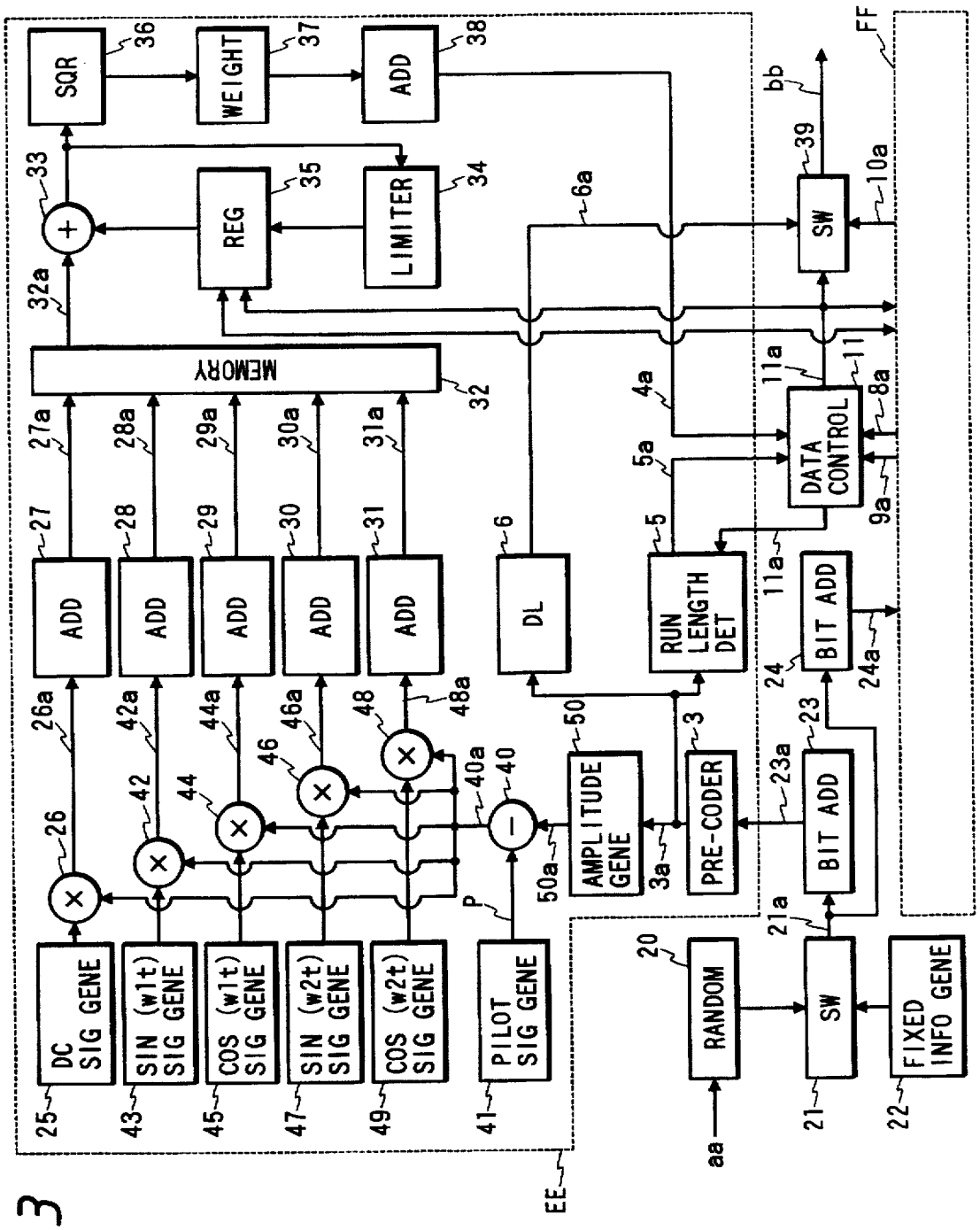
FIG. 3 is a block diagram of a digital information modulating apparatus according to a first embodiment of this invention.

FIG. 3 shows a digital information modulating apparatus according to a first embodiment of this invention. The digital information modulating apparatus of FIG. 3 includes a randomizer 20 to which an input information signal "aa" is fed. The input information signal "aa" has a sequence of bits. For a scrambling purpose, the randomizer 20 combines the input information signal "aa" and a maximum-length code signal by executing binary addition or modulo 2 addition therebetween. The randomizer 20 outputs a scrambling-resultant information signal to a switch 21.

A fixed-information generator 22 produces fixed-information signals such as a sync information signal and an IBG information signal. The IBG information signal contains a preamble information signal, a post-amble information signal, and a gap information signal for providing an overwriting margin and an editing surplus. A typical example of the sync information signal has a sequence of 15 bits in a predetermined pattern as "010000000001101". A typical example of the IBG information signal has a sequence of 23 bits in a predetermined pattern as "01101101101100011011011". The fixed-information generator 22 outputs the fixed-information signals to the switch 21.

The switch 21 sequentially selects one of the scrambling-resultant information signal and the fixed-information signals at given timings, and thereby combines the scrambling-resultant information signal and the fixed-information signals into a multiplexed information signal 21a. The switch 21 outputs the multiplexed information signal 21a to bit adding devices 23 and 24.

Figure 4:
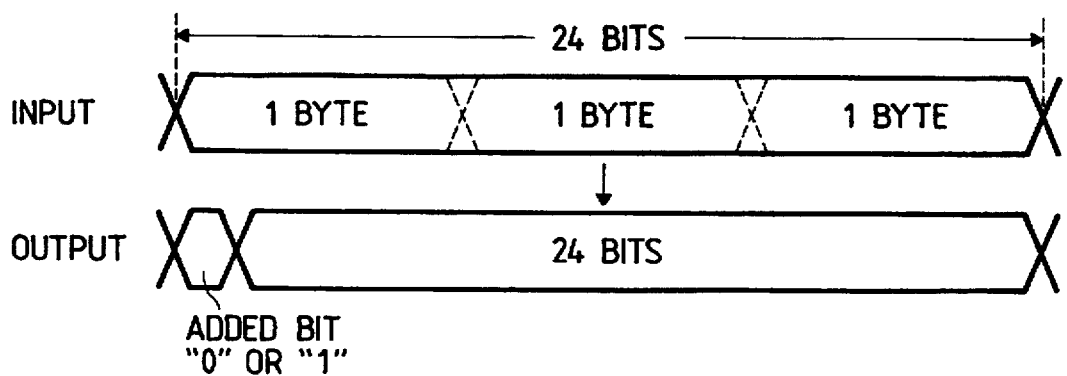
FIG. 4 is a diagram of a 24-bit block, and a 25-bit block which results from 24–25 conversion of the 24-bit block.
Figure 5:
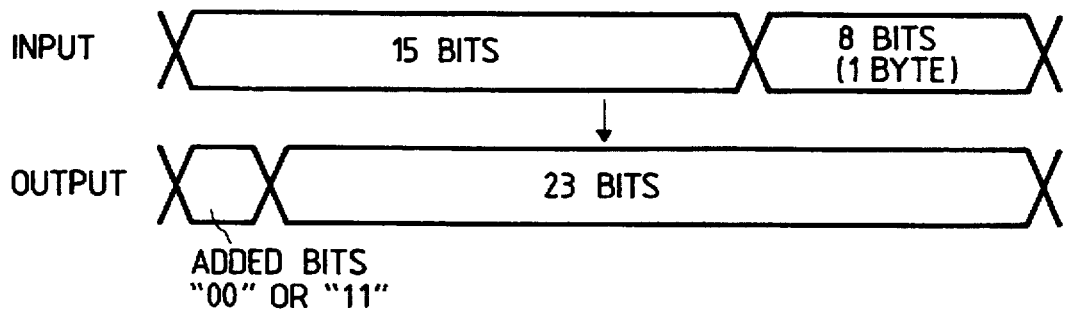
FIG. 5 is a diagram of a 23-bit block, and a 25-bit block which results from 23–25 conversion of the 23-bit block.

The bit adding devices 23 and 24 subject the multiplexed information signal 21a to the following 24–25 or 23–25 conversions. As shown in FIG. 4, in the case where the multiplexed information signal 21a continuously agrees with the scrambling-resultant information signal, the bit adding devices 23 and 24 add a bit of "0" and a bit of "1" to the head of every 24-bit sequence (block) respectively. In this way, every 24-bit block is converted into a pair of 25-bit blocks. As shown in FIG. 5. in the case where the multiplexed information signal 21a agrees with the sync information signal and then agrees with the scrambling-resultant information signal, the bit adding devices 23 and 24 combines the sync information signal and 8 bits of the scrambling-resultant information signal into a 23-bit sequence (block) and add two bits of "00" and two bits of "11" to the head of the 23-bit sequence respectively. In this way, such a 23-bit block is converted into a pair of 25-bit blocks. In the case where the multiplexed information signal 21a agrees with the IBG information signal, the bit adding devices 23 and 24 add two bits of "00" and two bits of "11" to the head of the 23-bit IBG information signal respectively. Thus, such a 23-bit block is converted into a pair of 25-bit blocks. The bit adding device 23 outputs the conversion-resultant information signal 23a to a pre-coder 3 within a data processor (an error detector or an error signal generator) EE. The bit adding device 24 outputs the conversion-resultant information signal 24a to a pre-coder within a data processor (an error detector or an error signal generator) FF.

The data processors EE and FF are similar in structure. Only the data processor EE will be described in detail hereinafter.

Figures 6, 7:
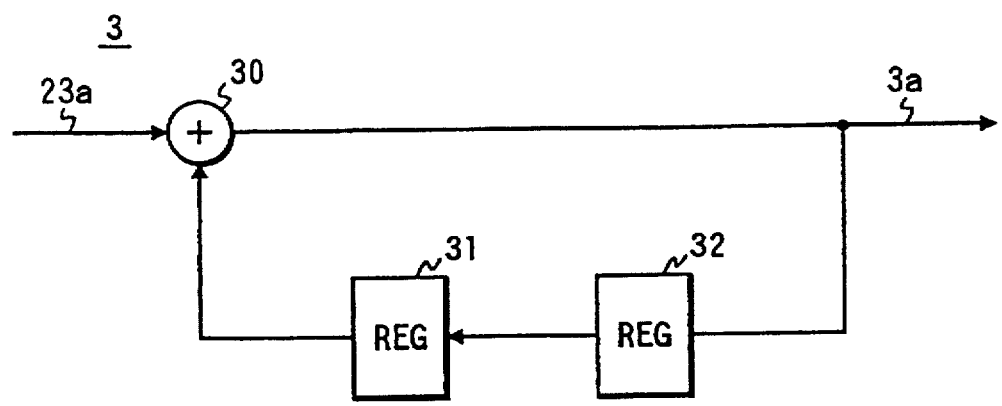
FIG. 6 is a block diagram of a pre-coder in the digital information modulating apparatus of FIG. 3.
FIG. 7 is a diagram of states of examples of bit sequences in the digital information modulating apparatus of FIG. 3.

The pre-coder 3 within the data processor EE receives the conversion-resultant information signal 23a from the bit adding device 23. As shown in FIG. 6, the pre-coder 3 includes an adder 30 and registers 31 and 32. A first input terminal of the adder 30 is subjected to the conversion-resultant information signal 23a. A second input terminal of the adder 30 is connected to the output terminal of the register 31. The input terminal of the register 31 is connected to the output terminal of the register 32. The input terminal of the register 32 is connected to the output terminal of the adder 30.

In the pre-coder 3 of FIG. 6, the adder 130 combines the conversion-resultant information signal 23a and an output signal of the register 131 into a pre-coded information signal 3a. The registers 131 and 132 operate in response to a clock signal having a period corresponding to one bit. The registers 131 and 132 cooperate to delay the pre-coded information signal 3a by a given time corresponding to two bits. The register 131 outputs the delay-resultant information signal to the adder 130.

In this way, the pre-coder 3 within the data processor EE encodes the conversion-resultant information signal 23a into the pre-coded information signal 3a. The pre-encoder 3 outputs the pre-coded information signal 3a to an amplitude generator 50. The portions (A) and (C) of FIG. 7 show the states of examples of 25-bit sequences (25-bit blocks in the conversion-resultant information signals 23a and 24a) generated by the 24–25 conversions related to FIG. 4 respectively. The portions (E) and (G) of FIG. 7 show the states of examples of 25-bit sequences (25-bit blocks in the conversion-resultant information signals 23a and 24a) generated by the 23–25 conversions related to FIG. 5 respectively. When a 25-bit sequence in the conversion-resultant information signal 23a has the state shown in the portion (A) of FIG. 7, a corresponding 25-bit sequence in the pre-coded information signal 3a assumes a state shown in the portion (B) of FIG. 7. When a 25-bit sequence in the conversion-resultant information signal 23a has the state shown in the portion (E) of FIG. 7, a corresponding 25-bit sequence in the pre-coded information signal 3a assumes a state shown in the portion (F) of FIG. 7.

Similarly, the pre-coder within the data processor FF encodes the conversion-resultant information signal 24a into a pre-coded information signal. When a 25-bit sequence in the conversion-resultant information signal 24a has the state shown in the portion (C) of FIG. 7, a corresponding 25-bit sequence in the pre-coded information signal assumes a state shown in the portion (D) of FIG. 7. When a 25-bit sequence in the conversion-resultant information signal 24a has the state shown in the portion (G) of FIG. 7, a corresponding 25-bit sequence in the pre-coded information signal assumes a state shown in the portion (H) of FIG. 7.

The amplitude generator 50 receives the pre-coded information signal 3a from the pre-coder 3. The amplitude generator 50 produces an amplitude information signal 50a in response to the pre-coded information signal 3a. The amplitude generator 50 assigns every bit of "1" in the pre-coded information signal 3a to a signal segment (a data piece) representing a predetermined amplitude value "+a" where "a" denotes a predetermined real number. In other words, the amplitude generator 50 converts every bit of "1" in the pre-coded information signal 3a into a time segment (a data piece) of the amplitude information signal 50a which represents the predetermined amplitude value "+a". Furthermore, the amplitude generator 50 assigns every bit of "0" in the pre-coded information signal 3a to a signal segment (a data piece) representing a predetermined amplitude value "−a". In other words, the amplitude generator 50 converts every bit of "0" in the pre-coded information signal 3a into a time segment (a data piece) of the amplitude information signal 50a which represents the predetermined amplitude value "−a". The amplitude generator 50 outputs the amplitude information signal 50a to a subtracter 40. Generally, the amplitude information signal 50a has a sequence of data pieces each having a multi-bit parallel form. Thus, the amplitude information signal generator 50 is of the 1-bit input and multi-bit output type.

For example, the amplitude generator 50 includes a ROM which stores data of the predetermined amplitude value "+a" and data of the predetermined amplitude value "−a" at different storage segments denoted by an address signal of "1" and an address signal of "0" respectively. In this case, the pre-coded information signal 3a is applied to the ROM as an address signal, and the data is read out from the ROM in response to the address signal. The readout data constitutes the amplitude information signal 50a.

The subtracter 40 receives the amplitude information signal 50a from the amplitude generator 50. A pilot signal generator 41 includes, for example, a ROM which generates a composite pilot information signal P corresponding to pilot signals having predetermined frequencies ω1 and ω2. The pilot signal generator 41 outputs the generated pilot information signal P to the subtracter 40. The subtracter 40 subtracts the pilot information signal P from the amplitude information signal 50a, thereby converting the amplitude information signal 50a into a pilot-suppressed information signal 40a.

In the case where the amplitude information signal 50a and the pilot information signal P are represented by Dn and P1·sin(ω1tn) respectively, the pilot-suppressed information signal 40a is expressed as:

$$Dn - P1 \cdot \sin(\omega 1 tn)$$

where P1 denotes the amplitude of the pilot information signal and the suffix "n" denotes a time point or a data piece order number. Accordingly, n=0, 1, 2, 3, . . .

The degrees of suppression of pilot signals are adjusted in accordance with the ratio between the amplitude value "a" provided by the amplitude generator 50 and the amplitude value of the pilot information signal P.

A signal generator 25 outputs a DC component signal representing a direct-current signal component. A multiplier 26 receives the DC component signal from the signal generator 25 and also receives the pilot-suppressed information signal 40a from the subtracter 40, multiplying the DC component signal and the pilot-suppressed information signal 40a and thereby extracting a DC component from the pilot-suppressed information signal 40a. The multiplier 26 outputs the multiplication-resultant information signal 26a to an adder 27.

A signal generator 43 outputs a sin(ω1t) component signal representing a signal component having the pilot signal frequency ω1. A multiplier 42 receives the sin(ω1t) component signal from the signal generator 43 and also receives the pilot-suppressed information signal 40a from the subtracter 40, multiplying the sin(ω1t) component signal and the pilot-suppressed information signal 40a and thereby extracting a sin(ω1t) component from the pilot-suppressed information signal 40a. The multiplier 42 outputs the multiplication-resultant information signal 42a to an adder 28.

In the case where the output signal of the signal generator 43 is represented by Ab·sin(ω1t), the multiplication-resultant information signal 42a is expressed as:

$$\{Dn - P1 \cdot \sin(\omega 1 t)\} \cdot \{Ab \cdot \sin(\omega 1 t)\}$$

where Ab denotes a predetermined amplitude value.

A signal generator 45 outputs a cos(ω1t) component signal representing a signal component having the pilot signal frequency ω1. A multiplier 44 receives the cos(ω1t) component signal from the signal generator 45 and also receives the pilot-suppressed information signal 40a from the subtracter 40, multiplying the cos(ω1t) component signal and the pilot-suppressed information signal 40a and thereby extracting a cos(ω1t) component from the pilot-suppressed information signal 40a. The multiplier 44 outputs the multiplication-resultant information signal 44a to an adder 29.

A signal generator 47 outputs a sin(ω2t) component signal representing a signal component having the pilot signal frequency ω2. A multiplier 46 receives the sin(ω2t) component signal from the signal generator 47 and also receives the pilot-suppressed information signal 40a from the subtracter 40, multiplying the sin(ω2t) component signal and the pilot-suppressed information signal 40a and thereby extracting a sin(ω2t) component from the pilot-suppressed information signal 40a. The multiplier 46 outputs the multiplication-resultant information signal 46a to an adder 30.

A signal generator 49 outputs a cos(ω2t) component signal representing a signal component having the pilot signal frequency ω2. A multiplier 48 receives the cos(ω2t) component signal from the signal generator 49 and also receives the pilot-suppressed information signal 40a from the subtracter 40, multiplying the cos(ω2t) component signal and the pilot-suppressed information signal 40a and thereby extracting a cos(ω2t) component from the pilot-suppressed information signal 40a. The multiplier 48 outputs the multiplication-resultant information signal 48a to an adder 31.

The adder 27 receives the multiplication-resultant information signal 26a from the multiplier 26. The adder 27 accumulates or adds successive data pieces (time segments) of the multiplication-resultant information signal 26a into an addition-resultant information signal 27a during every interval corresponding to 25 bits with respect to the pre-coded information signal 3a. The adder 27 outputs the addition-resultant information signal 27a to a memory 32. The addition executed by the adder 27 enables later-stage circuits to be of low-speed operation types and simple structures.

A sequence of 25 data pieces in the pilot-suppressed information signal 40a is now denoted by {d00, d01, d02, . . . , d024}. The DC component signal outputted from the signal generator 25 is now denoted by Aa where Aa denotes a predetermined amplitude value. In this case, the addition-resultant information signal 27a outputted from the adder 27 is expressed as:

$$\sum_{n=0}^{24} d0n \cdot Aa$$

The adder 28 receives the multiplication-resultant information signal 42a from the multiplier 42. The adder 28 accumulates or adds successive data pieces (time segments) of the multiplication-resultant information signal 42a into an addition-resultant information signal 28a during every interval corresponding to 25 bits with respect to the pre-coded information signal 3a. The adder 28 outputs the addition-resultant information signal 28a to the memory 32. The addition executed by the adder 28 enables later-stage circuits to be of low-speed operation types and simple structures.

A sequence of 25 data pieces in the sin(ω1t) component signal outputted from the signal generator 43 is now denoted by {Ab·sin (ω1t0), Ab·sin (ω1t1), Ab·sin (ω1t2), . . . , Ab·sin (ω1t24)} where Ab denotes a predetermined amplitude value. In this case, the addition-resultant information signal 28a outputted from the adder 28 is expressed as:

$$\sum_{n=0}^{24} d0n \cdot Ab \cdot \sin(\omega 1tn)$$

Since the pilot-suppressed information signal d0n is also represented by Dn−P1·sin(ω1tn), the above-indicated equation is rewritten as:

$$\sum_{n=0}^{24} Dn \cdot Ab \cdot \sin(\omega 1tn) - \{P1 \cdot \sin(\omega 1tn)\} \cdot \{Ab \cdot \sin(\omega 1tn)\}$$

The adder 29 receives the multiplication-resultant information signal 44a from the multiplier 44. The adder 29 accumulates or adds successive data pieces (time segments) of the multiplication-resultant information signal 44a into an addition-resultant information signal 29a during every interval corresponding to 25 bits with respect to the pre-coded information signal 3a. The adder 29 outputs the addition-resultant information signal 29a to the memory 32. The addition executed by the adder 29 enables later-stage circuits to be of low-speed operation types and simple structures.

A sequence of 25 data pieces in the cos(ω1t) component signal outputted from the signal generator 45 is now denoted by {Ab·cos(ω1t0), Ab·cos(ω1t1), Ab·cos(ω1t2), . . . , Ab·cos (ω1t24)}. In this case, the addition-resultant information signal 29a outputted from the adder 29 is expressed as:

$$\sum_{n=0}^{24} d0n \cdot Ab \cdot \cos(\omega 1tn)$$

The adder 30 receives the multiplication-resultant information signal 46a from the multiplier 46. The adder 30 accumulates or adds successive data pieces (time segments) of the multiplication-resultant information signal 46a into an addition-resultant information signal 30a during every interval corresponding to 25 bits with respect to the pre-coded information signal 3a. The adder 30 outputs the addition-resultant information signal 30a to the memory 32. The addition executed by the adder 30 enables later-stage circuits to be of low-speed operation types and simple structures.

A sequence of 25 data pieces in the sin(ω2t) component signal outputted from the signal generator 47 is now denoted by {Ac·sin (ω2t0), Ac·sin (ω2t1), Ac·sin (ω2t2), . . . , Ac·sin (ω2t24)} where Ac denotes a predetermined amplitude value. In this case, the addition-resultant information signal 30a outputted from the adder 30 is expressed as:

$$\sum_{n=0}^{24} d0n \cdot Ac \cdot \sin(\omega 2tn)$$

The adder 31 receives the multiplication-resultant information signal 48a from the multiplier 48. The adder 31 accumulates or adds successive data pieces (time segments) of the multiplication-resultant information signal 48a into an addition-resultant information signal 31a during every interval corresponding to 25 bits with respect to the pre-coded information signal 3a. The adder 31 outputs the addition-resultant information signal 31a to the memory 32. The addition executed by the adder 31 enables later-stage circuits to be of low-speed operation types and simple structures.

A sequence of 25 data pieces in the cos(ω2t) component signal outputted from the signal generator 49 is now denoted by {Ac·cos(ω2t0), Ac·cos(ω2t1), Ac·cos(ω2t2), . . . , Ac·cos ($\omega2t24$)}. In this case, the addition-resultant information signal 31a outputted from the adder 31 is expressed as:

$$\sum_{n=0}^{24} dOn \cdot Ac \cdot \cos(\omega 2tn)$$

The amplitude values Aa, Ab, and Ac relate to depths of notch characteristics. As will be made clear later, a weighting device 37 is used to adjust the relative notch depths instead of the amplitude values Aa, Ab, and Ac. Thus, the amplitude values Aa, Ab, and Ac can be set independent of desired notch depths. It is preferable to set the amplitude values Aa, Ab, and Ac so as to reduce required bit numbers of the devices 25–31 and 42–49. The amplitude values Aa, Ab, and Ac are most preferably set as Aa=Ab=Ac or Ab=Ac.

The memory 32 temporarily holds the addition-resultant information signals 27a–31a outputted from the adders 27–31. The memory 32 sequentially outputs the addition-resultant information signals 27a–31a to an adder 33 at given timings as a memory output signal 32a.

When the memory output signal 32a agrees with the addition-resultant information signal 27a, the adder 33 adds the present addition-resultant information signal 27a and a result of accumulation (summation) of the previous addition-resultant information signals 27a which is fed from a register 35. In this way, the adder 33 derives a new result of accumulation (summation) of the present and previous addition-resultant information signals 27a.

In other words, the adder 33 derives a new accumulation result related to the DC component. The output signal of the adder 33 which represents the DC component accumulation result is subjected to an amplitude limiting process by a limiter 34. The output signal of the limiter 34 is stored into the register 35. The amplitude limitation by the limiter 34 is designed so that the signal written into the register 35 will not exceed a dynamic range of the register 35. Specifically, the amplitude limitation uses a given upper limit and a given lower limit to prevent an overflow and an underflow. The randomizer 20 and the limiter 34 cooperate to effectively prevent an overflow and an underflow. Similar processes are sequentially executed with respect to the addition-resultant information signals 28a, 29a, 30a, and 31a. Therefore, the adder 33 sequentially derives accumulation results related to the sin($\omega1t$) component, the cos($\omega1t$) component, the sin($\omega2t$) component, and the cos($\omega2t$) component.

Data in the register 35 is periodically initialized to a given state. Specifically, data in the register 35 is initialized at the moment of the start of every given interval, for example, at the moment corresponding to the start of every track on a recording medium. The initialization of data in the register 35 is executed in response to a control signal 11a outputted from a data controller 11. In addition, data in the register 35 which represents the accumulation results can be changed. The change of data in the register 35 is executed in response to the control signal 11a. Specifically, the register 35 is connected to a corresponding register within the data processor FF. With respect to the two registers, the data in one register which corresponds to a pre-coded information signal selected in response to the control signal 11a is copied and transferred to the other register.

It should be noted that a switch may be provided which selects one of the output signals of the register 35 in the data processor EE and the corresponding register in the data processor FF in response to the control signal 11a. In this case, the output signal of the provided switch is fed to the adder 33.

The adder 33 sequentially outputs information signals representing the DC component accumulation result, the sin($\omega1t$) component accumulation result, the cos($\omega1t$) component accumulation result, the sin($\omega2t$) component accumulation result, and the cos($\omega2t$) component accumulation result. A squaring device 36 receives the information signals from the adder 33, and subjects the received information signals to a squaring process to detect the powers of the received information signals. A weighting device 37 receives the squaring-resultant information signals from the squaring device 36, and weights the received squaring-resultant information signals. Details of the weighting process are as follows. In the case where no pilot signal is intended to be superimposed on a modulation-resultant information signal "bb", the DC component information signal is multiplied by a weight coefficient of 4 while the other component information signals are multiplied by a weight coefficient of 1. In the case where a pilot signal having the preset frequency $\omega1$ is intended to be superimposed on the modulation-resultant information signal "bb", the sin($\omega1t$) component information signal and the cos($\omega1t$) component information signal are multiplied by a weight coefficient of 2 while the other component information signals are multiplied by a weight coefficient of 1. In the case where a pilot signal having the preset frequency $\omega2$ is intended to be superimposed on the modulation-resultant information signal "bb", the sin($\omega2t$) component information signal and the cos($\omega2t$) component information signal are multiplied by a weight coefficient of 2 while the other component information signals are multiplied by a weight coefficient of 1. As indicated above, all the weight coefficients are set to $2^b$ where "b" denotes natural numbers. This setting of the weight coefficients simplifies the structure of the weighting device 37. As previously described, the notch depths can be adjusted by changing the weighting coefficients.

The weighting device 37 sequentially outputs weighting-resultant information signals related to the DC component, the sin($\omega1t$) component, the cos($\omega1t$) component, the sin($\omega2t$) component, and the cos($\omega2t$) component respectively. An adder 38 receives the weighting-resulting information signals from the weighting device 37, and adds the received weighting-resultant information signals into a first error signal 4a. In this way, the weighting-resultant information signals related to the DC component, the sin($\omega1t$) component, the cos($\omega1t$) component, the sin($\omega2t$) component, and the cos($\omega2t$) component are combined into the first error signal 4a.

The first error signal 4a represents a result of evaluation of the frequency condition (the frequency spectrum) of the pre-coded information signal 3a outputted from the pre-coder 3. Specifically, the first error signal 4a depends on the frequency condition (the frequency spectrum) of the pre-coded information signal 3a, and indicates the difference (the error) between the sensed frequency condition and a desired frequency condition of the pre-coded information signal 3a. The adder 38 outputs the first error signal 4a to the data controller 11.

The data processor FF generates a second error signal 8a corresponding to the first error signal 4a. The second error signal 8a represents a result of evaluation of the frequency condition (the frequency spectrum) of a pre-coded information signal outputted from the pre-coder within the data processor FF which corresponds to the pre-coder 3 in the data processor EE. The pre-coder in the data processor FF processes the conversion-resultant information signal 24a outputted from the adding device 24. The second error signal 8a depends on the frequency condition (the frequency spectrum) of the pre-coded information signal within the data processor FF, and indicates the difference (the error)

between the sensed frequency condition and a desired frequency condition of the pre-coded information signal within the data processor FF. The data processor FF outputs the second error signal 8a to the data controller 11.

Also, the pre-coder 3 outputs the pre-coded information signal 3a to a run-length detector 5. The run-length detector 5 generates a run-length detection signal 5a from the pre-coded information signal 3a. The run-length detection signal 5a represents the number of successive bits of a same logic state (that is, a run length) in the pre-coded information signal 3a. The run-length detector 5 outputs the run-length detection signal 5a to the data controller 11.

In the data processor FF, a run-length detection signal 9a is similarly generated from the pre-coded information signal outputted by the pre-coder. The run-length detection signal 9a corresponds to the run-length detection signal 5a in the data processor EE. The data processor FF outputs the run-length detection signal 9a to the data controller 11.

In addition, the pre-coder 3 outputs the pre-coded information signal 3a to a delay device 6. The delay device 6 delays the pre-coded information signal 3a, and thereby converts the pre-coded information signal 3a into a delay-resultant pre-coded information signal 6a for timing adjustment. The delay device 6 outputs the delay-resultant pre-coded information signal 6a to a switch 39.

In the data processor FF, a delay-resultant pre-coded information signal 10a is similarly generated from the pre-coded information signal outputted by the pre-coder. The delay-resultant pre-coded information signal 10a corresponds to the delay-resultant pre-coded information signal 6a in the data processor EE. The data processor FF outputs the delay-resultant pre-coded information signal 10a to the switch 39.

The data controller 11a generates a control signal 11a in response to the error signals 4a and 8a and the run-length detection signals 5a and 9a. The data controller 11 outputs the generated control signal 11a to the register 35 within the data processor EE and also the corresponding register within the data processor FF. Furthermore, the data controller 11 outputs the generated control signal 11a to the switch 39. The switch 39 selects one of the delay-resultant pre-coded information signals 6a and 10a in response to the control signal 11a, and transmits the selected signal as an output information signal or a modulation-resultant information signal "bb".

The data controller 11 includes, for example, a signal processor or a microcomputer programmed to execute the following functions. In the case where one of the run lengths represented by the run-length detection signals 5a and 9a exceeds a threshold value, the data controller 11 sets the control signal 11a to a state enabling the switch 39 to select one of the delay-resultant pre-coded information signals 6a and 10a which is unrelated to the excess over the threshold value. In the case where both the run lengths represented by the run-length detection signals 5a and 9a exceed the threshold value and where the run lengths are different from each other, the data controller 11 sets the control signal 11a to a state enabling the switch 39 to select one of the delay-resultant pre-coded information signals 6a and 10a which is related to the smaller run-length. In the case where both the run lengths represented by the run-length detection signals 5a and 9a exceed the threshold value and where the run lengths are equal to each other, the data controller 11 compares the errors represented by the error signals 4a and 8a and sets the control signal 11a to a state enabling the switch 39 to select one of the delay-resultant pre-coded information signals 6a and 10a which is related to the smaller error. In the case where both the run lengths represented by the run-length detection signals 5a and 9a do not exceed the threshold value, the data controller 11 compares the errors represented by the error signals 4a and 8a and sets the control signal 11a to a state enabling the switch 39 to select one of the delay-resultant pre-coded information signals 6a and 10a which is related to the smaller error.

Figure 8:
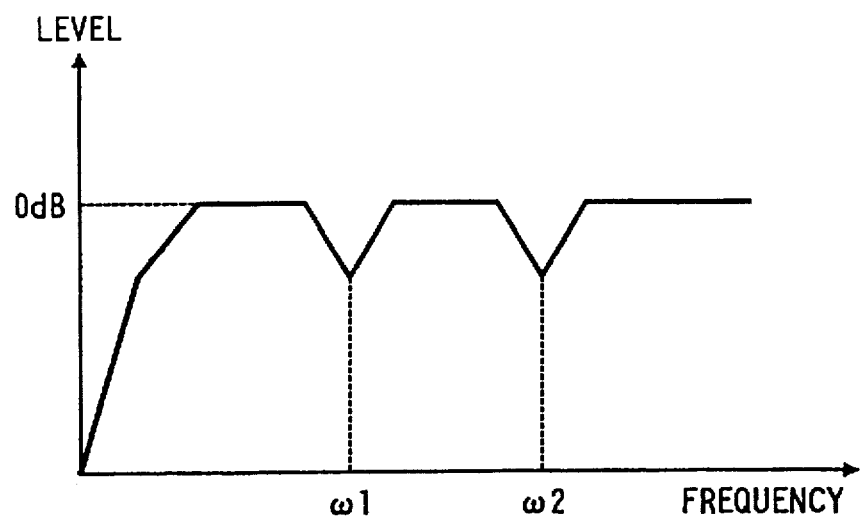
FIG. 8 is a diagram of the frequency spectrum of a modulation-resultant information signal of a first type.
Figure 9:
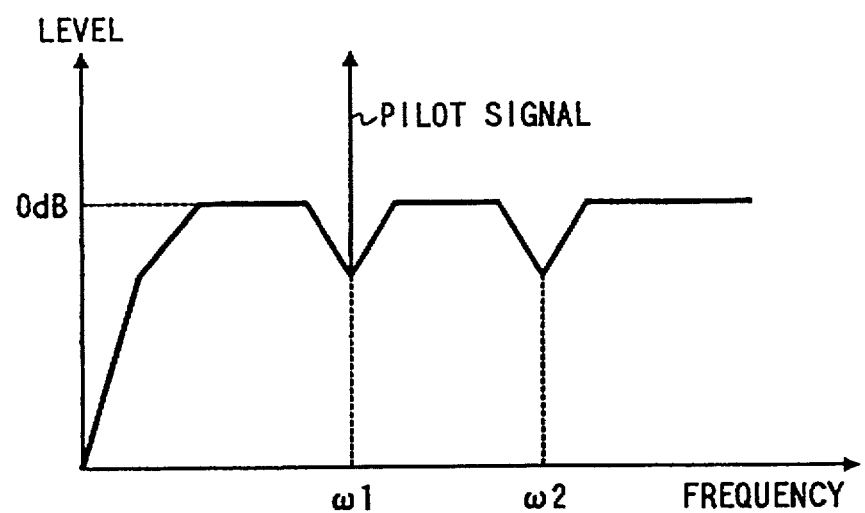
FIG. 9 is a diagram of the frequency spectrum of a modulation-resultant information signal of a second type.
Figure 10:
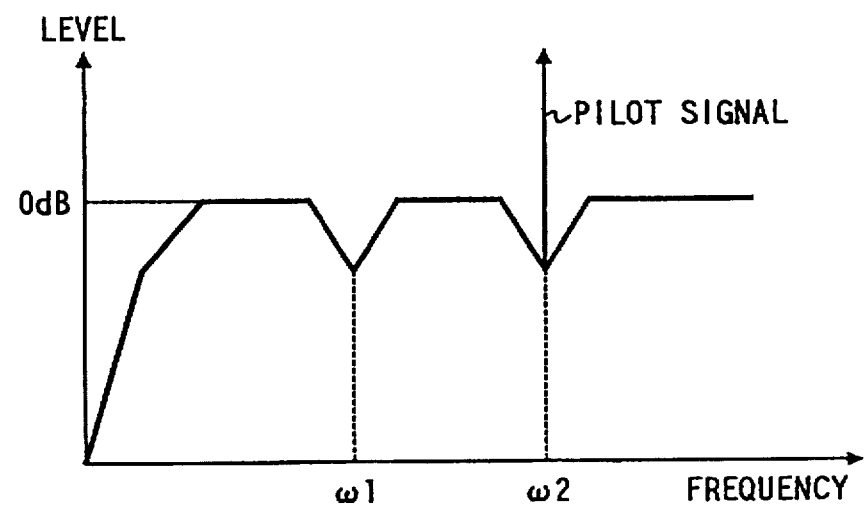
FIG. 10 is a diagram of the frequency spectrum of a modulation-resultant information signal of a third type.

The modulation-resultant information signal "bb" outputted from the digital information modulating apparatus of FIG. 3 is changeable among three different types F0, F1, and F2. FIGS. 8, 9, and 10 show an example of the frequency spectrums of an F0-type modulation-resultant information signal "bb", an F1-type modulation-resultant information signal "bb", and an F2-type modulation resultant information signal "bb". In each of the F0-type, the F1-type, and the F2-type, DC signal components are remarkably suppressed, and signal components having frequencies around the pilot signal frequencies ω1 and ω2 are moderately suppressed to provide notches. As shown in FIG. 8, both the pilot signals having the frequencies ω1 and ω2 are substantially absent from the F0-type.

As shown in FIG. 9, only the pilot signal having the frequency ω1 is present in the F1-type. As shown in FIG. 10, only the pilot signal having the frequency ω2 is present in the F2-type.

Second Embodiment

Figure 11:
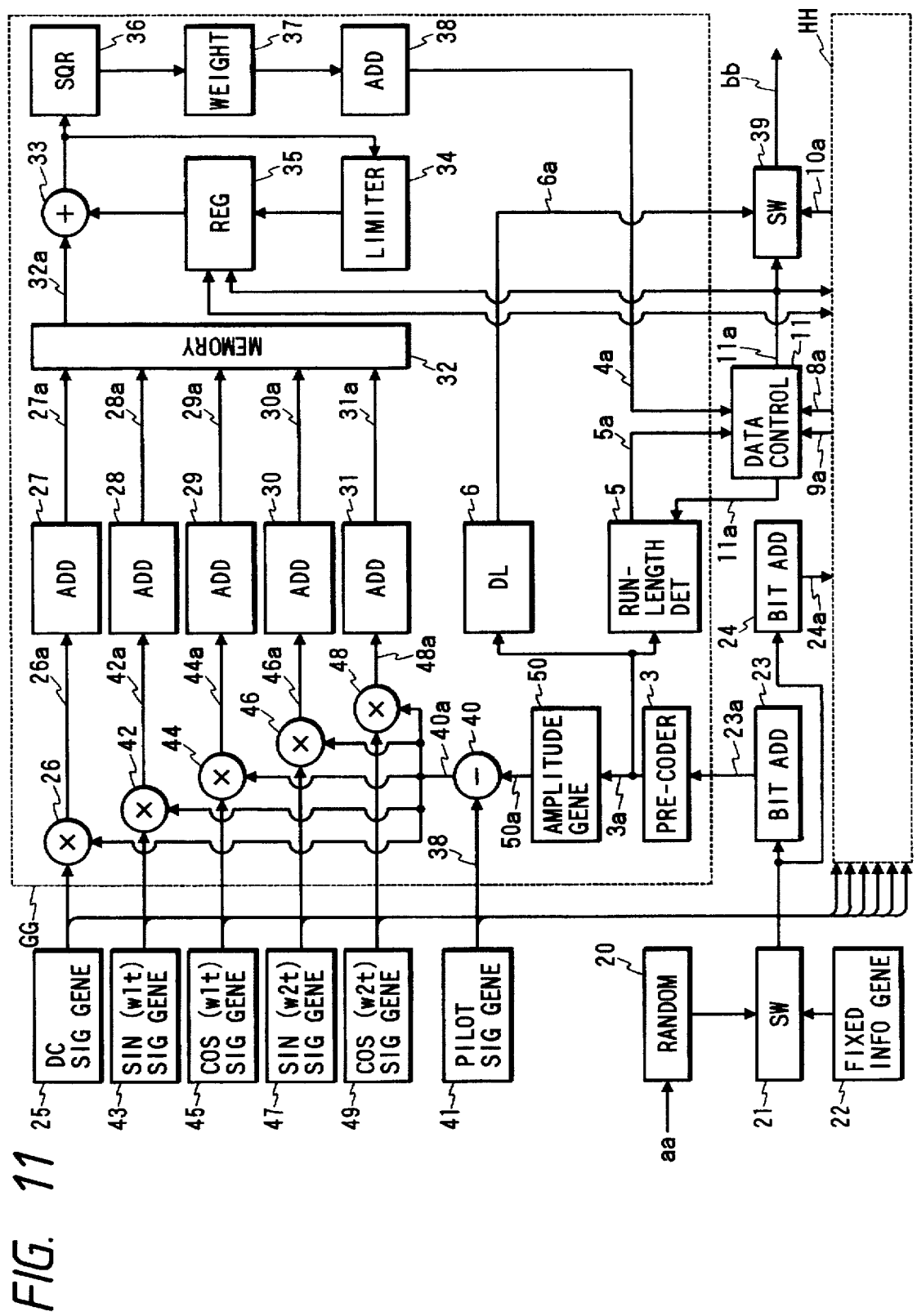
FIG. 11 is a block diagram of a digital information modulating apparatus according to a second embodiment of this invention.

FIG. 11 shows a second embodiment of this invention which is similar to the embodiment of FIG. 3 except for design changes indicated hereinafter. The embodiment of FIG. 11 uses data processors GG and HH instead of the data processors EE and FF (see FIG. 3) respectively. The data processor GG is similar to the data processor EE except that signal generators 25, 41, 43, 45, 47, and 49 are provided outside the data processor GG. The data processor HH is similar to the data processor FF except that signal generators corresponding to the signal generators 25, 41, 43, 45, 47, and 49 are omitted from the data processor HH. In the embodiment of FIG. 11, the output signals of the signal generators 25, 43, 45, 47, and 49 are fed to multipliers 26, 42, 44, 46, and 48 within the data processor GG and also corresponding multipliers within the data processor HH. In the embodiment of FIG. 11, the output signal of the signal generator 41 is fed to a subtracter 40 within the data processor GG and also a corresponding subtracter within the data processor HH. Accordingly, the signal generators 25, 41, 43, 45, 47, and 49 are used in common for the data processors GG and HH.

Third Embodiment

Figure 12:
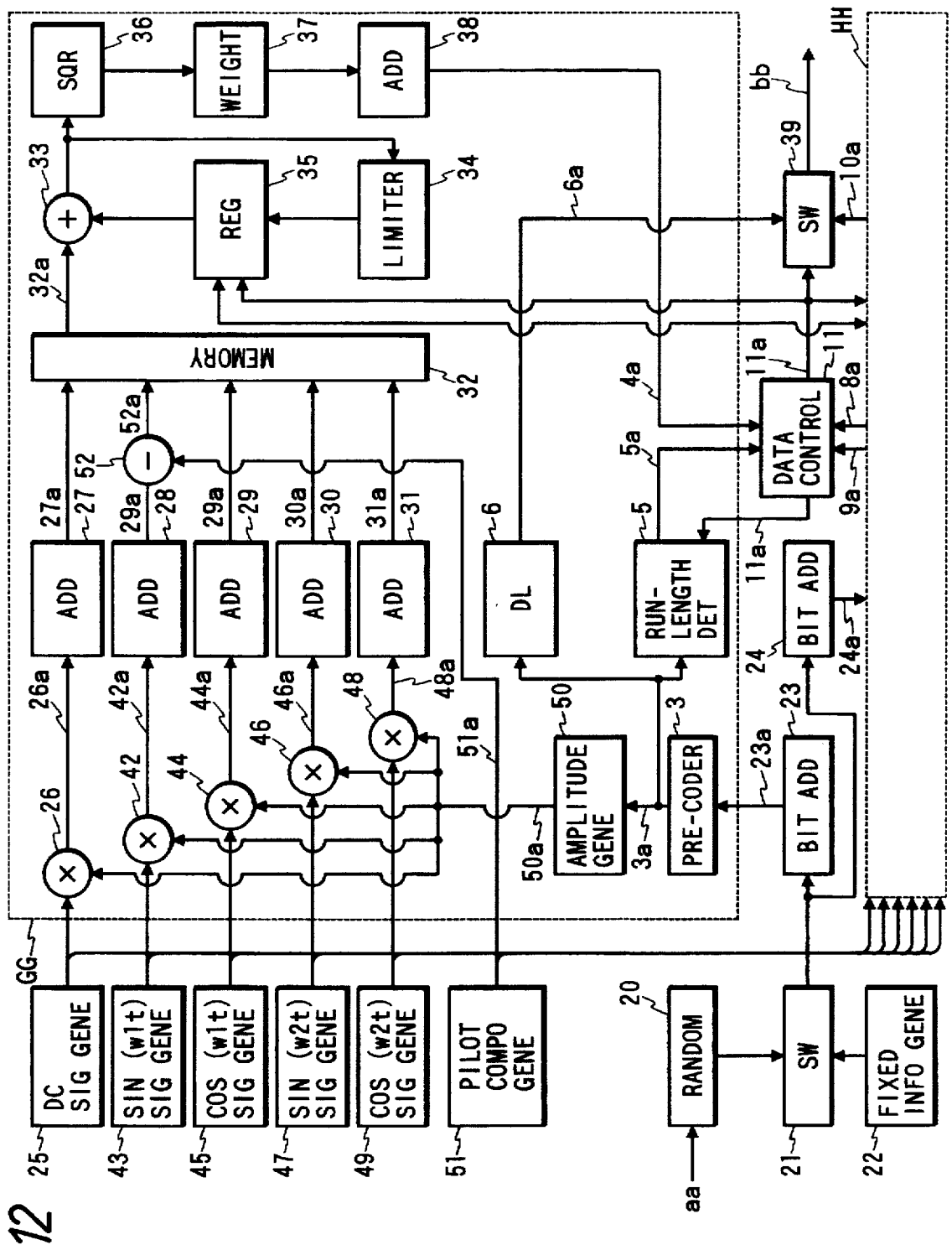
FIG. 12 is a block diagram of a digital information modulating apparatus according to a third embodiment of this invention.

FIG. 12 shows a third embodiment of this invention which is similar to the embodiment of FIG. 11 except for design changes indicated hereinafter. The embodiment of FIG. 12 is adapted to designing conditions where the phase and the frequency of a pilot information signal P are equal to the phase and the frequency of a sin(ω1t) component signal. The embodiment of FIG. 12 enables a reduction in required bit numbers of multipliers 26, 42, 44, 46, and 48.

A pilot signal generator 41 (see FIG. 11), a subtracter 40 (see FIG. 11) within a data processor GG, and a corresponding subtracter within a data processor HH are omitted from the embodiment of FIG. 12. In the data processor GG of the embodiment of FIG. 12, the output signal 50 a of an amplitude generator 50 is directly applied to the multipliers 26, 42, 44, 46, and 48. In this regard, the data processor HH is similar to the data processor GG.

The embodiment of FIG. 12 includes a pilot component generator 51 and a subtracter 52. The pilot component generator 51 produces a pilot component signal 51a, and outputs the pilot component signal 51a to the subtracter 52. The subtracter 52 is interposed between an adder 28 and a memory 32 within the data processor GG. The data processor HH includes a subtracter corresponding to the subtracter 52 within the data processor GG. The subtracter within the data processor HH receives the pilot component signal 51a from the pilot component generator 51.

The pilot component signal 51a outputted from the pilot component generator 51 iteratively represents calculation-result information at a period corresponding to 25 bits of a pre-coded information signal 3a. The calculation-result information represented by the pilot component signal 51a is expressed as:

$$\sum_{n=0}^{24} \{P1 \cdot \sin(\omega 1 tn)\} \cdot \{Ab \cdot \sin(\omega 1 tn)\}$$

where P1 denotes the amplitude of the pilot information signal P.

The subtracter 40 receives the pilot component signal 51a from the pilot component generator 51. The subtracter 40 receives an addition-resultant information signal 28a from the adder 28. The subtracter 40 subtracts the pilot component signal 51a from the addition-resultant information signal 28a, thereby converting the addition-resultant information signal 28a into a pilot-suppressed information signal 52a. The pilot-suppressed information signal 52a is expressed as:

$$\sum_{n=0}^{24} Dn \cdot Ab \cdot \sin(\omega 1 tn) - \{P1 \cdot \sin(\omega 1 tn)\} \cdot \{Ab \cdot \sin(\omega 1 tn)\}$$

where Dn denotes the information represented by the output signal 50a of the amplitude generator 50. The pilot-suppressed information signal 52a agrees with the addition-resultant information signal 28a in the data processor EE of FIG. 3 or the data processor GG of FIG. 11.

In the embodiment of FIG. 12, with regard to addition-resultant information signals 27a, 29a, 30a, and 31a outputted from adders 27, 29, 30, and 31, signal components related to the pilot information signal P are nullified during accumulation processes executed by later devices 33, 34, and 35.

In the case where a pilot signal having a preset frequency ω2 is also superimposed on a modulation-resultant information signal "bb", an additional subtracter (not shown) is interposed between the memory 32 and one of the adders 30 and 31, and a pilot component generator (not shown) is provided to feed a pilot component signal to the additional subtracter.

In the case where the frequency of the pilot information signal P is equal to the frequency of the sin(ω1t) component signal but the phase of the pilot information signal P is different from the phase of the sin(ω1t) component signal, an additional subtracter (not shown) is interposed between the memory 32 and the adder 29, and a pilot component generator (not shown) is provided to feed a pilot component signal to the additional subtracter.

It is now assumed that the period of the pilot signal P1·sin(ω1tn) corresponds to 60 bits with respect to the pre-coded information signal 3a, the period of repetition of the pilot information P1·sin(ω1tn)}·{Ab·sin(ω1tn) agrees with a 30-bit interval. On the other hand, the subtracter 52 executes the subtraction every 25-bit interval. Since the least common multiple between 25 and 30 is equal to 150, it is sufficient that 6 (=150/25) different calculation results are prepared in the pilot component generator 51. Accordingly, in this case, the pilot component generator 51 includes a resister for storing 6 information pieces representing the 6 different calculation results respectively, and the 6 information pieces are sequentially read out from the register as the pilot component signal 51a.

A description will now be given of a general case where the period of the pilot signal corresponds to "k" bits with respect to the pre-coded information signal 3a, and a word of the modulation-resultant information signal "bb" corresponds to "L" bits. In this case, it is sufficient that "q/k" different calculation results are prepared in the pilot component generator 51 where "q" denotes the least common multiple between the numbers "k" and "L". The pilot component generator 51 includes a resister for storing "q/k" information pieces representing the "q/k" different calculation results respectively, and the "q/k" information pieces are sequentially read out from the register as the pilot component signal 51a.

Fourth Embodiment

Figure 13:
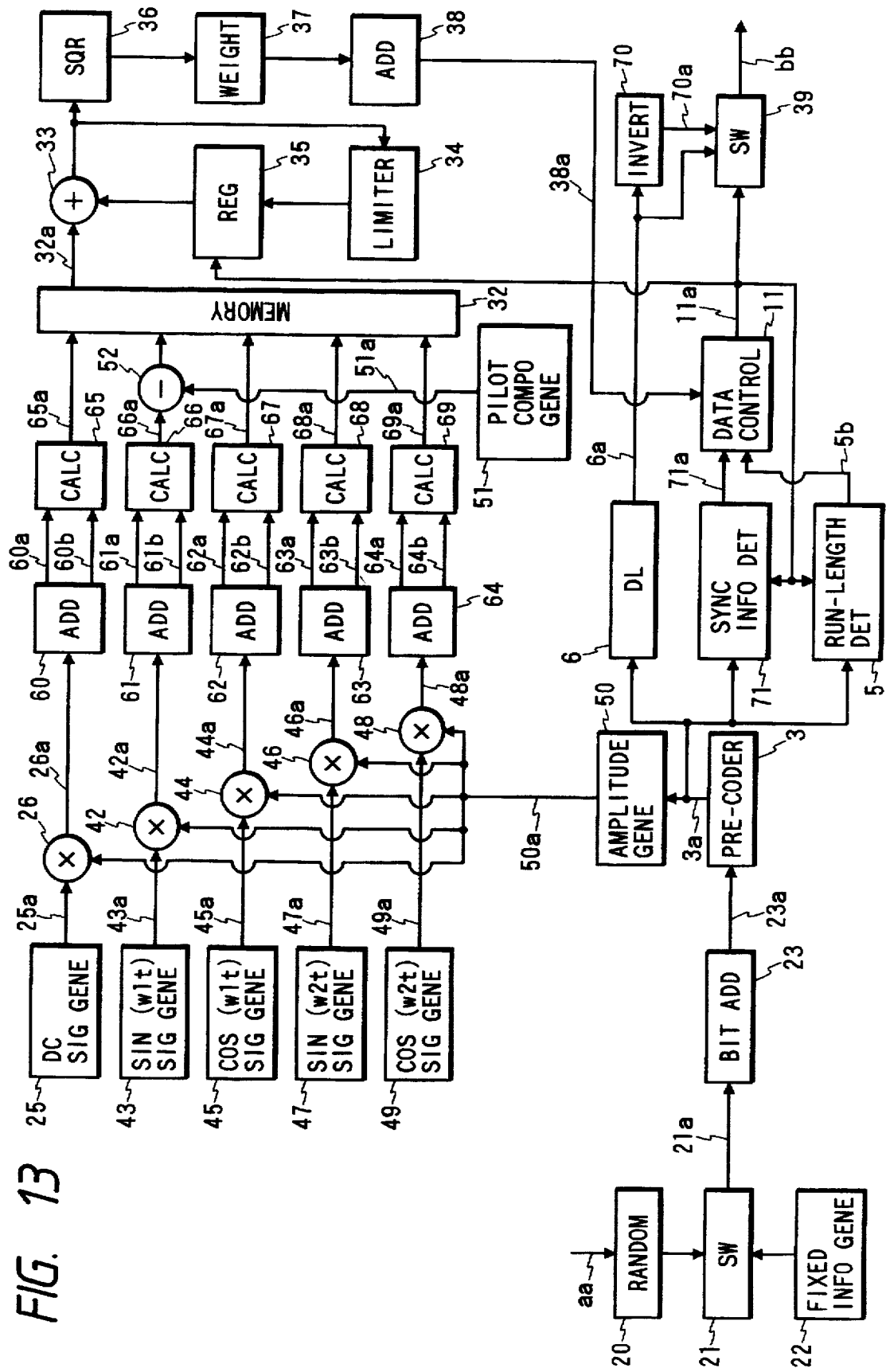
FIG. 13 is a block diagram of a digital information modulating apparatus according to a fourth embodiment of this invention.

FIG. 13 shows a fourth embodiment of this invention which is similar to the embodiment of FIG. 12 except for design changes indicated hereinafter. The embodiment of FIG. 13 dispenses with a data processor corresponding to the data processor HH in FIG. 12. The embodiment of FIG. 13 includes separative adders 60–64 and calculators 65–69 instead of the adders 27–31 in the embodiment of FIG. 12.

Every sequence of 25 data pieces in a pre-coded information signal 3a is now expressed as {d0, d1, d2, ..., d24}. Every sequence of 25 data pieces in a corresponding pre-coded information signal 3a generated in the data processor HH is now expressed as {DA0, DA1, DA2, ..., DA24}. In the case where the pre-coded information signals originate from the combination of an added bit of "0" and a multiplexed information signal 21a and the combination of an added bit of "1" and the multiplexed information signal 21a respectively, the pre-coded information signals have the following relations.

DA2n=d2n (n is an integer, and 0≦n≦12)

DA2n+1=(d2n+1)'(n is an integer, and 0≦n≦11)

where (d2n+1)' means inversion of d2n+1.

In the case where the pre-coded information signals originate from the combination of added bits of "00" and the multiplexed information signal 21a and the combination of added bits of "11" and the multiplexed information signal 21a respectively, the pre-coded information signals have the following relations.

DA2n=(d2n)' (n is an integer, and 0≦n≦12)

DA2n+1=(d2n+1)' (n is an integer, and 0≦n≦11)

where (d2n)' means inversion of d2n.

These relations between the pre-coded information signals will be further described. It is now assumed that bits in a 24-bit block of the multiplexed information signal 21a is denoted as {S0, S2, S2, S3, S4, ... }, and that a bit adding device 23 adds a bit of "0" to a head of the 24-bit block to change the 24-bit block to a 25-bit block. In this case, bits in the resultant 25-bit block are denoted by {0, S0, S2, S2, S3, S4, ... } as shown in the portion (A) of FIG. 14. In a pre-coder 3, an adder 30 (see FIG. 6) receives the 25-bit block. The adder 30 also receives an addition-resultant signal which results from delaying the output signal of the adder 30 by 2 bits and which has a state as shown in the portion (B) of FIG. 14. The output signal of the adder 30, which constitutes the pre-coded information signal 3a, has a state as shown in the portion (C) of FIG. 14.

The portions (D), (E), and (F) of FIG. 14 relate to the other pre-coded information signal, and correspond to the potions (A), (B), and (C) of FIG. 14 respectively. The aforementioned relations between the pre-coded information signals are confirmed from the portions (C) and (F) of FIG. 14.

It is now assumed that bits in a 23-bit block of the multiplexed information signal 21a is denoted as {S0, S2, S2, S3, S4, . . . }, and that the bit adding device 23 adds bits of "00" to a head of the 23-bit block to change the 23-bit block to a 25-bit block.

In this case, bits in the resultant 25-bit block are denoted by {0, 0, S0, S2, S2, S3, S4, . . . } as shown in the portion (G) of FIG. 14. In the pre-coder 3, the adder 30 (see FIG. 6) receives the 25-bit block. The adder 30 also receives an addition-resultant signal which results from delaying the output signal of the adder 30 by 2 bits and which has a state as shown in the portion (H) of FIG. 14. The output signal of the adder 30, which constitutes the pre-coded information signal 3a, has a state as shown in the portion (I) of FIG. 14.

The portions (J), (K), and (L) of FIG. 14 relate to the other pre-coded information signal, and correspond to the potions (G), (H), and (I) of FIG. 14 respectively. The aforementioned relations between the pre-coded information signals are confirmed from the portions (I) and (L) of FIG. 14.

By use of the above-indicated relations between the pre-coded information signals, the data processor corresponding to the data processor HH in FIG. 12 is omitted from the embodiment of FIG. 13.

The separative adder 60 receives a multiplication-resultant information signal 26a from a multiplier 26. The separative adder 60 separates every sequence of 25 data pieces in the multiplication-resultant information signal 26a into a first group of even-numbered data pieces and a second group of odd-numbered data pieces. The separative adder 60 accumulates or adds even-numbered data pieces in every first group into an even-numbered addition-resultant information signal 60a. Also, the separative adder 60 accumulates or adds odd-numbered data pieces in every second group into an odd-numbered addition-resultant information signal 60b. In an assumed case where an amplitude generator 50 is disregarded and predetermined amplitude values Aa, Ab, and Ac related to signal generators 25, 43, 45, 47, and 49 are equal to 1, the even-numbered addition-resultant information signal 60a is expressed as:

$$\sum_{n=0}^{12} d2n$$

In addition, the odd-numbered addition-resultant information signal 60b is expressed as:

$$\sum_{n=0}^{11} d2n+1$$

The separative adder 60 outputs the even-numbered addition-resultant information signal 60a and the odd-numbered addition-resultant information signal 60b to the calculator 65.

The separative adder 61 receives a multiplication-resultant information signal 42a from a multiplier 42. The separative adder 61 separates every sequence of 25 data pieces in the multiplication-resultant information signal 42a into a first group of even-numbered data pieces and a second group of odd-numbered data pieces. The separative adder 61 accumulates or adds even-numbered data pieces in every first group into an even-numbered addition-resultant information signal 61a. Also, the separative adder 61 accumulates or adds odd-numbered data pieces in every second group into an odd-numbered addition-resultant information signal 61b. In an assumed case where the amplitude generator 50 is disregarded and the predetermined amplitude values Aa, Ab, and Ac related to the signal generators 25, 43, 45, 47, and 49 are equal to 1, the even-numbered addition-resultant information signal 61a is expressed as:

$$\sum_{n=0}^{12} d2n \cdot \sin(\omega 1 t 2n)$$

In addition, the odd-numbered addition-resultant information signal 61b is expressed as:

$$\sum_{n=0}^{11} d2n+1 \cdot \sin(\omega 1 t 2n+1)$$

The separative adder 61 outputs the even-numbered addition-resultant information signal 61a and the odd-numbered addition-resultant information signal 61b to the calculator 66.

The separative adder 62 receives a multiplication-resultant information signal 44a from a multiplier 44. The separative adder 62 separates every sequence of 25 data pieces in the multiplication-resultant information signal 44a into a first group of even-numbered data pieces and a second group of odd-numbered data pieces. The separative adder 62 accumulates or adds even-numbered data pieces in every first group into an even-numbered addition-resultant information signal 62a. Also, the separative adder 62 accumulates or adds odd-numbered data pieces in every second group into an odd-numbered addition-resultant. information signal 62b. In an assumed case where the amplitude generator 50 is disregarded and the predetermined amplitude values Aa, Ab, and Ac related to the signal generators 25, 43, 45, 47, and 49 are equal to 1, the even-numbered addition-resultant information signal 62a is expressed as:

$$\sum_{n=0}^{12} d2n \cdot \cos(\omega 1 t 2n)$$

In addition, the odd-numbered addition-resultant information signal 62b is expressed as:

$$\sum_{n=0}^{11} d2n+1 \cdot \cos(\omega 1 t 2n+1)$$

The separative adder 62 outputs the even-numbered addition-resultant information signal 62a and odd-numbered addition-resultant information signal 62b to the calculator 67.

The separative adder 63 receives a multiplication-resultant information signal 46a from a multiplier 46. The separative adder 63 separates every sequence of 25 data pieces in the multiplication-resultant information signal 46a into a first group of even-numbered data pieces and a second group of odd-numbered data pieces. The separative adder 63 accumulates or adds even-numbered data pieces in every first group into an even-numbered addition-resultant information signal 63a. Also, the separative adder 63 accumulates or adds odd-numbered data pieces in every second group into an odd-numbered addition-resultant information signal 63b. In an assumed case where the amplitude generator 50 is disregarded and the predetermined amplitude values Aa, Ab, and Ac related to the signal generators 25, 43, 45, 47, and 49 are equal to 1, the even-numbered addition-resultant information signal 63a is expressed as:

$$\sum_{n=0}^{12} d2n \cdot \sin(\omega 2t 2n)$$

In addition, the odd-numbered addition-resultant information signal 63b is expressed as:

$$\sum_{n=0}^{11} d2n+1 \cdot \sin(\omega 2t 2n+1)$$

The separative adder 63 outputs the even-numbered addition-resultant information signal 63a and the odd-numbered addition-resultant information signal 63b to the calculator 68.

The separative adder 64 receives a multiplication-resultant information signal 48a from a multiplier 48. The separative adder 64 separates every sequence of 25 data pieces in the multiplication-resultant information signal 48a into a first group of even-numbered data pieces and a second group of odd-numbered data pieces. The separative adder 64 accumulates or adds even-numbered data pieces in every first group into an even-numbered addition-resultant information signal 64a. Also, the separative adder 64 accumulates or adds odd-numbered data pieces in every second group into an odd-numbered addition-resultant information signal 64b. In an assumed case where the amplitude generator 50 is disregarded and the predetermined amplitude values Aa, Ab, and Ac related to the signal generators 25, 43, 45, 47, and 49 are equal to 1, the even-numbered addition-resultant information signal 64a is expressed as:

$$\sum_{n=0}^{12} d2n \cdot \cos(\omega 2t 2n)$$

In addition, the odd-numbered addition-resultant information signal 64b is expressed as:

$$\sum_{n=0}^{11} d2n+1 \cdot \cos(\omega 2t 2n+1)$$

The separative adder 64 outputs the even-numbered addition-resultant information signal 64a and the odd-numbered addition-resultant information signal 64b to the calculator 69.

The calculator 65 receives the even-numbered addition-resultant information signal 60a and the odd-numbered addition-resultant information signal 60b from the separative adder 60. The calculator 65 generates and outputs an information signal 65a in response to the even-numbered addition-resultant information signal 60a and the odd-numbered addition-resultant information signal 60b. The calculator 65 outputs the information signal 65a to a memory 32.

The calculator 66 receives the even-numbered addition-resultant information signal 61a and the odd-numbered addition-resultant information signal 61b from the separative adder 61. The calculator 66 generates and outputs an information signal 66a in response to the even-numbered addition-resultant information signal 61a and the odd-numbered addition-resultant information signal 61b. The calculator 66 outputs the information signal 66a to a subtracter 52.

The calculator 67 receives the even-numbered addition-resultant information signal 62a and the odd-numbered addition-resultant information signal 62b from the separative adder 62. The calculator 67 generates and outputs an information signal 67a in response to the even-numbered addition-resultant information signal 62a and the odd-numbered addition-resultant information signal 62b. The calculator 67 outputs the information signal 67a to the memory 32.

The calculator 68 receives the even-numbered addition-resultant information signal 63a and the odd-numbered addition-resultant information signal 63b from the separative adder 63. The calculator 68 generates and outputs an information signal 68a in response to the even-numbered addition-resultant information signal 63a and the odd-numbered addition-resultant information signal 63b. The calculator 68 outputs the information signal 68a to the memory 32.

The calculator 69 receives the even-numbered addition-resultant information signal 64a and the odd-numbered addition-resultant information signal 64b from the separative adder 64. The calculator 69 generates and outputs an information signal 69a in response to the even-numbered addition-resultant information signal 64a and the odd-numbered addition-resultant information signal 64b. The calculator 69 outputs the information signal 69a to the memory 32.

A sequence of 25 data pieces in the pre-coded information signal 3a is now denoted by $\{d0, d1, d2, \ldots, dn, \ldots, d24\}$. To detect a frequency condition of the pre-coded information signal 3a, which results from the combination of an added bit of "0" and a multiplexed information signal 21a or the combination of added bits of "00" and the multiplexed information signal, each of the calculators 65–69 adds the related even-numbered addition-resultant information signal and the related odd-numbered addition-resultant information signal. In this case, the information signals 65a–69a are expressed as:

$$\sum_{n=0}^{12} d2n + \sum_{n=0}^{11} d2n+1 = \sum_{n=0}^{24} dn$$

$$\sum_{n=0}^{12} d2n \cdot \sin(\omega 1 t 2n) + \sum_{n=0}^{11} d2n+1 \cdot \sin(\omega 1 t 2n+1) = \sum_{n=0}^{24} dn \cdot \sin(\omega 1 t n)$$

$$\sum_{n=0}^{12} d2n \cdot \cos(\omega 1 t 2n) + \sum_{n=0}^{11} d2n+1 \cdot \cos(\omega 1 t 2n+1) =$$

$$\sum_{n=0}^{24} dn \cdot \cos(\omega 1 t n)$$

$$\sum_{n=0}^{12} d2n \cdot \sin(\omega 2 t 2n) + \sum_{n=0}^{11} d2n+1 \cdot \sin(\omega 2 t 2n+1) = \sum_{n=0}^{24} dn \cdot \sin(\omega 2 t n)$$

$$\sum_{n=0}^{12} d2n \cdot \cos(\omega 2 t 2n) + \sum_{n=0}^{11} d2n+1 \cdot \cos(\omega 2 t 2n+1) =$$

$$\sum_{n=0}^{24} dn \cdot \cos(\omega 2 t n)$$

To detect a frequency condition of the other pre-coded information signal which results from the combination of an added bit of "1" and the multiplexed information signal 21a, each of the calculators 65–69 subtracts the related even-numbered addition-resultant information signal from the related odd-numbered addition-resultant information signal. Under these conditions, the information signals 65a–69 are expressed as:

$$\sum_{n=0}^{11} d2n+1 - \sum_{n=0}^{12} d2n = \sum_{n=0}^{24} DAn$$

$$\sum_{n=0}^{11} d2n+1 \cdot \sin(\omega 1 t2n+1) - \sum_{n=0}^{12} d2n \cdot \sin(\omega 1 t2n) =$$

$$\sum_{n=0}^{24} DAn \cdot \sin(\omega 1 tn)$$

$$\sum_{n=0}^{11} d2n+1 \cdot \cos(\omega 1 t2n+1) - \sum_{n=0}^{12} d2n \cdot \cos(\omega 1 t2n) =$$

$$\sum_{n=0}^{24} DAn \cdot \cos(\omega 1 tn)$$

$$\sum_{n=0}^{11} d2n+1 \cdot \sin(\omega 2 t2n+1) - \sum_{n=0}^{12} d2n \cdot \sin(\omega 2 t2n) =$$

$$\sum_{n=0}^{24} DAn \cdot \sin(\omega 2 tn)$$

$$\sum_{n=0}^{11} d2n+1 \cdot \cos(\omega 2 t2n+1) - \sum_{n=0}^{12} d2n \cdot \cos(\omega 2 t2n) =$$

$$\sum_{n=0}^{24} DAn \cdot \cos(\omega 2 tn)$$

where $\{DAn\}=\{-d0, d1, -d2, d3, \ldots\}$.

To detect a frequency condition of the other pre-coded information signal which results from the combination of added bits of "11" and the multiplexed information signal 21a, each of the calculators 65–69 adds the related even-numbered addition-resultant information signal and the related odd-numbered addition-resultant information signal, and then inverts the sign of the resultant signal. In this case, the information signals 65a–69a are expressed as:

$$-\sum_{n=0}^{24} dn = \sum_{n=0}^{24} DAn$$

$$-\sum_{n=0}^{24} dn \cdot \sin(\omega 1 tn) = \sum_{n=0}^{24} DAn \cdot \sin(\omega 1 tn)$$

$$-\sum_{n=0}^{24} dn \cdot \cos(\omega 1 tn) = \sum_{n=0}^{24} DAn \cdot \cos(\omega 1 tn)$$

$$-\sum_{n=0}^{24} dn \cdot \sin(\omega 2 tn) = \sum_{n=0}^{24} DAn \cdot \sin(\omega 2 tn)$$

$$-\sum_{n=0}^{24} dn \cdot \cos(\omega 2 tn) = \sum_{n=0}^{24} DAn \cdot \cos(\omega 2 tn)$$

where $DAn=-dn$.

In this way, the calculators 65–69 generate first information of the frequency condition of the pre-coded information signal 3a and second information of the frequency condition of the other pre-coded information signal. The calculators 65–69 multiplex the first information and the second information into the information signals 65a–69a on a time division basis.

It should be noted that a bit adding device 23 may be modified to add a bit of "1" or two bits of "11".

The subtracter 52, the memory 32, an adder 33, a limiter 34, a register 35, a squaring device 36, a weighting device 37, and an adder 38 process the information related to the pre-coded information signal 3a and the information related to the other pre-coded information signal on a time division basis. The adder 38 generates an error signal 38a which alternately represents an error related to the pre-coded information signal 3a and an error related to the other pre-coded information signal. In other words, the error signals 4a and 8a in the embodiment of FIG. 12 are multiplexed into the error signal 38a on a time division basis. The adder 38 outputs the error signal 38a to a data controller 11.

Similarly, a run-length detector 5 detects information related to the pre-coded information signal 3a and information related to the other pre-coded information signal. The run-length detector 5 generates a run-length detection signal 5b which alternately represents the information related to the pre-coded information signal 3a and the information related to the other pre-coded information signal. In other words, the information related to the pre-coded information signal 3a and the information related to the other pre-coded information signal are multiplexed into the run-length detection signal 5b on a time division basis. The run-length detector 5 outputs the run-length detection signal 5b to the data controller 11.

A sync information detector 71 receives the pre-coded information signal 3a. The sync information detector 71 detects whether or not a bit pattern equal to a predetermined sync bit pattern is present in the pre-coded information signal 3a during an interval assigned to signals other than a sync information signal. The sync information detector 71 generates the other pre-coded information signal on the basis of the pre-coded information signal 3a. The sync information detector 71 detects whether or not a bit pattern equal to the predetermined sync bit pattern is present in the other pre-coded information signal during an interval assigned to signals other than the sync information signal. The sync information detector 71 generates a sync detection signal 71b which alternately represents the detected information related to the pre-coded information signal 3a and the detected information related to the other pre-coded information signal. In other words, the detected information related to the pre-coded information signal 3a and the detected information related to the other pre-coded information signal are multiplexed into the sync detection signal 71b on a time division basis. The sync information detector 71 outputs the sync detection signal 71b to the data controller 11.

The data controller 11 receives the error signal 38a from the adder 38. In addition, the data controller 11 receives the run-length detection signal 5b from the run-length detector 5. Furthermore, the data controller 11 receives the sync detection signal 71b from the sync information detector 71. The data controller 11 generates a control signal 11a in response to the error signal 38a, the run-length detection signal 5b, and the sync detection signal 71b. When highest priority is given to limitation of run-length, the generation of the control signal 11a refers to a priority order which is set as the run-length detection signal 5b, the sync detection signal 71b, and the error signal 38a. When highest priority is given to prevention of wrong detection of a sync information signal, the generation of the control signal 11a refers to a priority order which is set as the sync detection signal 71b, the run-length detection signal 5b, and the error signal 38a. The data controller 11 outputs the control signal 11 a to a switch 39.

An inverter 70 receives a delay-resultant pre-coded information signal 6a from a delay device 6. In the case where the delay-resultant pre-coded information signal 6a agrees with a fixed-information signal, the inverter 70 inverts all successive bits of the delay-resultant pre-coded information signal 6a and changes the information signal 6a into an inversion-resultant information signal 70a. In the case where the delay-resultant pre-coded information signal 6a agrees with other information signals, the inverter 70 inverts even-numbered bits but does not invert odd-numbered bits of the delay-resultant pre-coded information signal 6a and changes the information signal 6a into an inversion-resultant information signal 70a. The inversion-resultant information signal 70a agrees with the other delay-resultant pre-coded information signal. The inverter 70 outputs the inversion-resultant information signal 70a to the switch 39.

The switch receives the delay-resultant pre-coded information signal 6a from the delay device 6. In addition, the switch 39 receives the inversion-resultant information signal 70a from the inverter 70. Furthermore, the switch 39 receives the control signal 11a from the data controller 11. The switch 39 selects one of the delay-resultant pre-coded information signal 6a and the inversion-resultant information signal 70a in response to the control signal 11a, and transmits the selected signal as an output information signal or a modulation-resultant information signal "bb".

Other Embodiments

The embodiment of FIG. 3 may be modified into an arrangement which uses a pilot component generator 51 (see FIG. 12) instead of the pilot signal generator 41.

Each of the embodiments of FIG. 3, FIG. 11 and FIG. 12 may be modified into an arrangement in which n-bit information is added to a multiplexed information signal 21a for every m-bit period. Here, "m" and "n" denote given natural numbers. It is possible to generate $2^n$ different pre-coded information signals. Only S different pre-coded information signals among the $2^n$ different pre-coded information signals may be actually generated, where "S" denotes a given natural number smaller than $2^n$. In this case, S different error signal generators similar to the data processor EE of FIG. 3 are provided to produce S different error signals, and one of the S different pre-coded information signals is selected in response to the S different error signals. A pilot signal generator or a pilot component generator may be used in common by the S different error signal generators.

In each of the embodiments of FIG. 3, FIG. 11, FIG. 12, and FIG. 13, the squaring device 36 may be replaced by an absolute-value calculator.

Each of the embodiments of FIG. 3, FIG. 11, FIG. 12, and FIG. 13 may be modified for adaptation to conditions where "q" different notch frequencies are present. Here, "q" denotes a given natural number different from 3.

In each of the embodiments of FIG. 3, FIG. 11, FIG. 12, and FIG. 13, the pilot information signal P generated by the pilot signal generator 41 or the pilot component signal 51a generated by the pilot component generator 51 may be out of phase with respect to an actual pilot information signal in the pre-coded information signal 3a by 180°. Accordingly, the subtracter 40 or 52 may be replaced by an operation device which executes addition or subtraction.

What is claimed is:

1. A digital information modulating apparatus comprising:
    means for dividing information into first blocks each having m bits, where m denotes a predetermined natural number;
    means for adding n bit or bits in each of S different states to a head of each of the first blocks to change the first block into S second blocks each having m+n bits, where n denotes a predetermined natural number and S denotes a predetermined natural number equal to or smaller than $2^n$;
    means for pre-coding each of the S second blocks into S pre-coded information blocks respectively;
    means for selecting one of the S pre-coded information blocks as a modulation-resultant information signal in response to error signals related to the S pre-coded information blocks respectively, the modulation-resultant information signal having q different notch frequencies;
    means for converting the S pre-coded information blocks into S amplitude signals representing amplitude values respectively;
    means for generating 2q different waveform signals grouped into a set of q first waveform signals and a set of q second waveform signals, the q first waveform signals representing waveforms related to the q notch frequencies respectively, the q second waveform signals being different in phase from the q first waveform signals by 90° respectively;
    means for multiplying each of the S amplitude signals and the 2q waveform signals into 2q multiplication-resultant signals;
    means for adding and accumulating the 2q multiplication-resultant signals into 2q addition-resultant signals respectively with respect to each of the S pre-coded information blocks; and
    means for generating an error signal in response to the 2q addition-resultant signals, and thereby generating the S error signals related to the S pre-coded information blocks respectively.

2. The digital information modulating apparatus of claim 1, further comprising:
    means for generating a pilot information signal representing a predetermined frequency equal to one of the q notch frequencies and representing a predetermined phase equal to a phase of one of the 2q waveform signals; and
    means for processing addition-resultant signals among the 2q addition-resultant signals in response to the pilot information signal before the addition-resultant signals are fed to the error-signal generating means, wherein the processed addition-resultant signals relate to the notch frequency equal to the frequency of the pilot information signal, and relate to the waveform signal equal in phase with the pilot information signal.

3. The digital information modulating apparatus of claim 1, wherein the waveform-signal generating means comprises waveform-signal generators used in common with respect to the generation of the S error signals.

4. The digital information modulating apparatus of claim 1, wherein said adding and accumulating means comprises means for adding and accumulating the 2q multiplication-resultant signals into 2q addition-resultant signals respectively with respect to each of the S pre-coded information blocks during every predetermined period of time which corresponds to m+n bits related to the S pre-coded information blocks.

5. The digital information modulating apparatus of claim 1, further comprising:
    means for generating a pilot information signal; and
    means for processing the S amplitude signals in response to the pilot information signal before the S amplitude signals are fed to the multiplying means.

6. The digital information modulating apparatus of claim 5, wherein the pilot-information-signal generating means comprises a pilot-information-signal generator used in common with respect to the generation of the S error signals.

7. The digital information modulating apparatus of claim 1, further comprising:
    means for generating a pilot information signal representing a predetermined frequency equal to one of the q notch frequencies; and means for processing addition-resultant signals among the 2q addition-resultant signals in response to the pilot information signal before the addition-resultant signals are fed to the error-signal generating means, wherein the processed addition-resultant signals relate to the notch frequency equal to the frequency represented by the pilot information signal.

8. The digital information modulating apparatus of claim 7, wherein the pilot-information-signal generating means comprises a pilot-information-signal generator used in common with respect to the generation of the S error signals.

9. The digital information modulating apparatus of claim 1, wherein the error-signal generating means comprises:

means for accumulating the 2q addition-resultant signals into 2q accumulation-resultant signals with respect to each of the S pre-coded information blocks respectively;

means for squaring the 2q accumulation-resultant signals and thereby converting the 2q accumulation-resultant signals into 2q squaring-resultant signals respectively;

means for weighting the 2q squaring-resultant signals in response to predetermined weight coefficients, and thereby converting the 2q squaring-resultant signals into 2q weighting-resultant signals respectively; and means for generating an error signal in response to the 2q weighting-resultant signals, and thereby generating the S error signals related to the S pre-coded information blocks respectively.

10. The digital information modulating apparatus of claim 9, wherein the accumulating means comprises means for limiting the 2q accumulation-resultant signals in response to predetermined upper and lower limit values.

11. A digital information modulating apparatus comprising:

means for dividing an information-representing bit sequence into first blocks each having m bits, where m denotes a predetermined natural number equal to 1 or more;

means for adding one of a bit of "0" and a bit of "1" to a head of each of the first blocks to change the first block into a second block having m+1 bits;

means for delaying each of the second blocks by two bits and generating a first delay-resultant signal, and adding a current bit of the second block and a current bit of the first delay-resultant signal to pre-code each of the second blocks into a first pre-coded information block;

means for generating a second pre-coded information block in response to the first pre-coded information block, the second pre-coded information block corresponding to a resultant of adding the other of a bit of "0" and a bit of "1" to a head of each of the first blocks;

means for selecting one of the first and second pre-coded information blocks as a modulation-resultant information signal in response to error signals related to the first and second pre-coded information blocks respectively, the modulation-resultant information signal having q different notch frequencies;

means for converting the first pre-coded information block into an amplitude signal representing an amplitude value for every bit with respect to the first pre-coded information block;

means for generating 2q different waveform signals grouped into a set of q first waveform signals and a set of q second waveform signals, the q first waveform signals representing waveforms related to the q notch frequencies respectively, the q second waveform signals being different in phase from the q first waveform signals by 90° respectively;

means for multiplying the amplitude signal and the 2q waveform signals into 2q multiplication-resultant signals;

means for adding and accumulating even-numbered bits of the 2q multiplication-resultant signals into 2q even-numbered addition-resultant signals respectively;

means for adding and accumulating odd-numbered bits of the 2q multiplication-resultant signals into 2q odd-numbered addition-resultant signals respectively;

means for adding the 2q even-numbered addition-resultant signals and the 2q odd-numbered addition-resultant signals into 2q first calculation-resultant signals respectively;

means for subtracting the 2q even-numbered addition-resultant signals from the 2q odd-numbered addition-resultant signals, and thereby generating 2q second calculation-resultant signals respectively;

means for generating the first error signal in response to the 2q first calculation-resultant signal; and means for generating the second error signal in response to the 2q second calculation-resultant signal.

12. The digital information modulating apparatus of claim 11, further comprising:

means for generating a pilot information signal representing a predetermined frequency equal to one of the q notch frequencies; and means for processing addition-resultant signals among the 2q first calculation-resultant signals and the 2q second calculation-resultant signals in response to the pilot information signal before the addition-resultant signals are fed to the error-signal generating means, wherein the processed addition-resultant signals relate to the notch frequency equal to the frequency represented by the pilot information signal.

13. The digital information modulating apparatus of claim 11, further comprising:

means for generating a pilot information signal representing a predetermined frequency equal to one of the q notch frequencies and representing a predetermined phase equal to a phase of one of the 2q waveform signals; and means for processing addition-resultant signals among the 2q first calculation-resultant signals and the 2q second calculation-resultant signals in response to the pilot information signal before the addition-resultant signals are fed to the error-signal generating means, wherein the processed addition-resultant signals relate to the notch frequency equal to the frequency of the pilot information signal, and relate to the waveform signal equal in phase with the pilot information signal.

14. A digital information modulating apparatus comprising:

means for dividing an information-representing bit sequence into first blocks each having m bits of m−1 bits, wherein each of the first blocks having m−1bits represent fixed information, and m denotes a predetermined natural number equal to 1 or more;

means for adding one of a bit of "0" and a bit of "1" to a head of each of the first blocks having m bits, and adding one of bits of "00" and bits of "11" to a head of each of the first blocks having m−1 bits to change every first block into a second block having m+1 bits;

means for delaying each of the second blocks by two bits and generating a first delay-resultant signal, and adding a current bit of the second block and a current bit of the first delay-resultant signal to pre-code each of the second blocks into a first pre-coded information block;

means for generating a second pre-coded information block in response to the first pre-coded information block, the second pre-coded information block corresponding to a resultant of adding the other of a bit of "0" and a bit of "1" to a head of each of the first blocks having m bits and addition of the other of bits of "00" and bits of "11" to a head of each of the first blocks having m−1 bits;

means for selecting one of the first and second pre-coded information blocks as a modulation-resultant information signal in response to a first error signals related to the first pre-coded information block, a second error signal related to the second pre-coded information block, and a third error signal related to the fixed information, the modulation-resultant information signal having q different notch frequencies;

means for converting the first pre-coded information block into an amplitude signal representing an amplitude value for every bit with respect to the first pre-coded information block;

means for generating 2q different waveform signals grouped into a set of q first waveform signals and a set of q second waveform signals, the q first waveform signals representing waveforms related to the q notch frequencies respectively, the q second waveform signals being different in phase from the q first waveform signals by 90° respectively;

means for multiplying the amplitude signal and the 2q waveform signals into 2q multiplication-resultant signals;

means for adding and accumulating even-numbered bits of the 2q multiplication-resultant signals into 2q even-numbered addition-resultant signals respectively;

means for adding and accumulating odd-numbered bits of the 2q multiplication-resultant signals into 2q odd-numbered addition-resultant signals respectively;

means for adding the 2q even-numbered addition-resultant signals and the 2q odd-numbered addition-resultant signals into 2q first calculation-resultant signals respectively;

means for subtracting the 2q even-numbered addition-resultant signals from the 2q odd-numbered addition-resultant signals, and thereby generating 2q second calculation-resultant signals respectively;

means for generating 2q third calculation-resultant signals equal to sign-inversions of the first calculation-resultant signals respectively;

means for generating the first error signal in response to the 2q first calculation-resultant signal;

means for generating the second error signal in response to the 2q second calculation-resultant signal; and means for generating the third error signal in response to the 2q third calculation-resultant signal.

* * * * *